INVENTORS
EDWARD F. LAUMANN
HARRY J. JACOB, JR.
BY Yount, Raney, Flynn & Tarolli
ATTORNEYS INVENTORS
EDWARD F. LAUMANN
HARRY J. JACOB JR.
BY Yount, Raney, Flynn, & Tarolli
ATTORNEYS INVENTORS
EDWARD F. LAUMANN
HARRY J. JACOB JR.
BY Young, Ramey, Flynn, & Tarolli
ATTORNEYS INVENTORS
EDWARD F. LAUMANN
HARRY J. JACOB JR.
BY Yount, Raney, Flynn, & Tarolli
ATTORNEYS INVENTORS
EDWARD F. LAUMANN
HARRY J. JACOB, JR
BY Yount, Ramsy, Flynn, & Tarolli
ATTORNEYS

MACHINE TOOL WITH TOOL CHANGING MECHANISM

Filed Jan. 17, 1967

INVENTORS
EDWARD F. LAUMANN
HARRY J. JACOB, JR.
BY Yount, Raney, Flynn & Tarolli
ATTORNEYS INVENTORS
EDWARD F. LAUMANN
HARRY J. JACOB, JR.
BY Yount, Raney, Flynn & Tarolli
ATTORNEYS INVENTORS
EDWARD F. LAUMANN
HARRY J. JACOB, JR.
BY
Yount, Rasey, Flynn, & Tarolli
ATTORNEYS

MACHINE TOOL WITH TOOL CHANGING MECHANISM

Filed Jan. 17, 1967

INVENTORS-
EDWARD F. LAUMANN
HARRY J. JACOB, JR.
BY-
Yount, Ramey, Flynn, & Tarolli
ATTORNEYS INVENTOR.
EDWARD F. LAUMANN
HARRY J. JACOB JR.
BY Young, Raney, Flynn, & Tarolli
ATTORNEYS INVENTORS-
EDWARD F. LAUMANN
HARRY J. JACOB, JR.
BY-
Young, Ramey, Flynn & Tirrell
ATTORNEYS INVENTORS
EDWARD F. LAUMANN
HARRY J. JACOB, JR.
BY Yount, Ramsey, Flynn & Tarolli
ATTORNEYS

MACHINE TOOL WITH TOOL CHANGING MECHANISM

Filed Jan. 17, 1967

INVENTORS-
EDWARD F. LAUMANN
HARRY J. JACOB, JR.
BY- Yount, Raney, Flynn & Tarolli
ATTORNEYS INVENTORS
EDWARD F. LAUMANN
HARRY J. JACOB JR.
BY Yount, Raney, Flynn & Tarolli
ATTORNEYS

MACHINE TOOL WITH TOOL CHANGING MECHANISM

INVENTOR.
EDWARD F. LAUMANN
HARRY J. JACOB JR.
BY Yount, Ranney, Flynn & Tarolli
ATTORNEYS

United States Patent Office 3,449,822
Patented June 17, 1969

3,449,822

MACHINE TOOL WITH TOOL CHANGING MECHANISM

Edward F. Laumann, Sylvania, and Harry J. Jacob, Jr., South Russell, Ohio, assignors to The Warner & Swasey Company, Cleveland, Ohio, a corporation of Ohio Filed Jan. 17, 1967, Ser. No. 609,802
Int. Cl. B23q 3/155
U.S. Cl. 29—568 35 Claims

ABSTRACT OF THE DISCLOSURE

A tool storage magazine is mounted on top of a spindle head which rotatably supports the machine tool spindle of a machine tool. Tools for use in the spindle are stored in storage fingers defining storage locations or sockets which are arranged in two spaced parallel rows and a carrier, which operates between the rows, is adapted to remove a tool from either one of the storage rows and deliver it to a position where it is transferred to an intermediate transfer arm which is adapted to move it into position for transfer to a spindle hand-off arm and to reorient the angular position of the tool while it is being translated so that its axis is parallel to the axis of the spindle when it is positioned to be gripped by the spindle hand-off arm. The spindle hand-off arm is a double-ended arm which is adapted to receive a tool from the transfer arm at the same time that it grips a tool in the spindle and rotation of the spindle hand-off arm interchanges the positions of the tools to remove the old tool and position the new tool in alignment with the spindle axis. The spindle is connected to and from the tool by moving the spindle axially. A sequencing mechanism automatically moves a selected tool out of the storage magazine to the machine tool spindle and removes the old tool in the spindle and returns it to the storage magazine. Mechanism is provided for locking the tool holders in the storage sockets of the magazine and the carrier has mechanism associated therewith for unlocking only the socket selected for removal or return of a tool. The tool for the spindle is always handled by the same gripping device on the spindle hand-off arm when it is to be transferred to the spindle and the other gripping device when it is to be moved from the spindle back to the storage magazine and each gripping mechanism has a park position intermediate its position for holding a tool in alignment with the spindle and its position for transferring to or from the intermediate transfer arm. The tool holders each has a flange extending radially thereof and the carrier in the magazine has gripping arms which grip the opposite radial sides of the flange while the intermediate transfer arm has locking arms which interdigitate with the gripping arms on the carrier when both are gripping the flange and the spindle hand-off arm has gripping arms similar to the gripping arms on the carrier which are adapted to sandwich the locking arms on the intermediate transfer arm while moving to a gripping position.

One feature of the present invention lies in the provision of a tool changing mechanism in a machine tool having a rotatable spindle which is rotatably mounted in a vertically movable spindle head, the tool changing mechanism including a transfer arm mounted on the spindle head adjacent the spindle face and having a position in which it is adapted to receive and grip a tool with the axis of the tool extending crosswise of the spindle axis and to swing the tool in a plane generally perpendicular to the spindle axis and to reorient the tool so that its axis is parallel to the spindle axis prior to delivering it to additional transfer means for moving the tool into alignment with the spindle axis.

Another feature of the present invention is to provide a novel and improved, simplified transfer arm mechanism for a spindle head of a machine tool which is adapted to translate and reorient the tool.

Another feature of the present invention is the provision of tool changing mechanism for a machine tool in which a tool carrier has gripping arms for gripping the opposite radial sides of a flange on a tool holder and a transfer arm extending transversely of the gripping arms of the carrier to which the tool is to be transferred has locking arms which are adapted to grip the periphery of the tool and to interdigitate or sandwich with the gripping arms of the carrier to effect the transfer of the tool from the carrier to the transfer arm.

Further in accordance with a feature of the present invention a spindle hand-off arm pivoted intermediate its ends is provided for transferring tools to and from the machine tool spindle with the arm having a tool gripping device on each end with the tool gripping device on one end being adapted to grip a tool at a transfer position to be moved to the spindle and the tool gripping device on the other end being adapted to simultaneously grip a tool in the spindle so that rotation of the arm will interchange the positions of the gripping devices to position the new tool in alignment with the spindle and the old tool in the transfer position to be transferred away from the arm, the spindle hand-off arm preferably having a park position in which each of the gripping devices is disposed intermediate its positions for gripping tools at the transfer position and at the spindle position.

The invention further contemplates the provision of a tool changing mechanism for a machine tool in which a spindle hand-off arm having gripping devices, one at each end thereof, for moving tools to and from the spindle, is rotated by a motor having an intermediate position in which the spindle hand-off arm is in a park position and which is operated to rotate the arm in one direction to move the gripping devices to grip tools in the spindle and the transfer position respectively and in the opposite direction to interchange the tools and in the original direction to return the motor to a park position, the motor preferably being a fluid pressure motor which is spring biased to an intermediate position.

The present invention also contemplates the provision of a tool changing mechanism for a machine tool which includes a tool storage magazine having parallel rows of storage sockets for tool holders and in which a carrier is movable between the rows and has gripping arms which may be swung to one side or the other to grip a tool holder in a selected socket, the carrier having unlocking mechanism associated therewith for unlocking the storage socket of the selected tool only.

A further feature of the invention is to provide a new and improved tool handling mechanism in which a member has gripping elements for gripping a tool and a simplified novel and improved structure for operating and locking the gripping elements in which a piston and cylinder actuator is preferably disposed between parallel pivot axes for the gripping elements and operates crank means for opening and closing the elements.

A further feature of the invention is to provide a new and improved tool handling mechanism in which a member has gripping elements for gripping a tool and a simplified novel and improved structure for operating and locking the gripping elements in which a locking member is disposed to engage portions of the gripping elements projecting to one side of their pivot axes to lock the gripping elements closed and is operated to lock and unlock the elements and preferably to actuate a linkage for opening the gripping elements.

Further in accordance with a feature of the present invention, a tool may be selected from a storage magazine and transferred away from the magazine for use, a new tool selected and transferred from the storage magazine and the first tool returned to its original socket by mechanism which is controlled by a permutation responsive code means which includes one memory which is set to select a new tool and a second memory set in accordance with the previous tool transfer from the magazine to select the new tool in accordance with the first memory and to return the previous tool under the control of the second memory.

An additional feature of the present invention is the provision of a tool storage magazine which a carriage or carrier is movable in either direction past a plurality of storage locations and operates a switching means as it passes each location which is to initiate operation of the carrier at a slow rate and to finally position the carrier adjacent the selected storage location, the switching means preferably being part of a relay tree which establishes a circuit to a selected switching means depending upon the particular relays which are energized and deenergized.

In addition to the foregoing, the present invention further contemplates the provision of a new and improved tool handling mechanism in which a gripping mechanism extends radially from an axis and is swingable about the axis to translate a tool held by the gripping mechanism, the gripping mechanism comprising a movable gripping element pivoted for movement about an axis which extends crosswise of the axis of swinging movement with the element and having a first portion extending on the side of the pivot axis remote from the part of the element for engaging the tool with the first portion being engaged by a rotatable member movable by a finger which is reciprocable along the axis of rotation of the gripping mechanism by the operation of power means lying along this axis to control the opening and closing of the gripping mechanism.

Another object is to provide a new and improved tool changing mechanism which includes power means for relatively positioning tool storage sockets and transfer means to select a particular socket and in which the positioning is controlled by a relay tree including switches actuated when the transfer means is in approximate transfer positions adjacent the respective tool sockets.

Further objects and advantages of the present invention will be apparent from the following detailed description thereof made with reference to the accompanying drawings forming a part of the present specification for all subject matter disclosed therein and in which.

Figure 21:
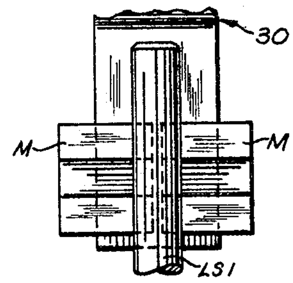
Figure 6:
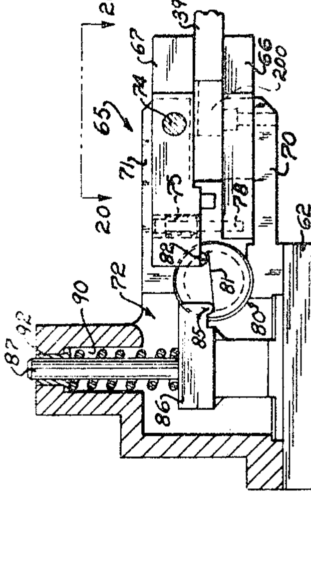
FIG. 6 is a detail view with parts in section of the gripping mechanism of the carrier of the tool storage magazine shown in FIG. 5 looking approximately from line 6—6 of FIG. 5.
Figure 16A:
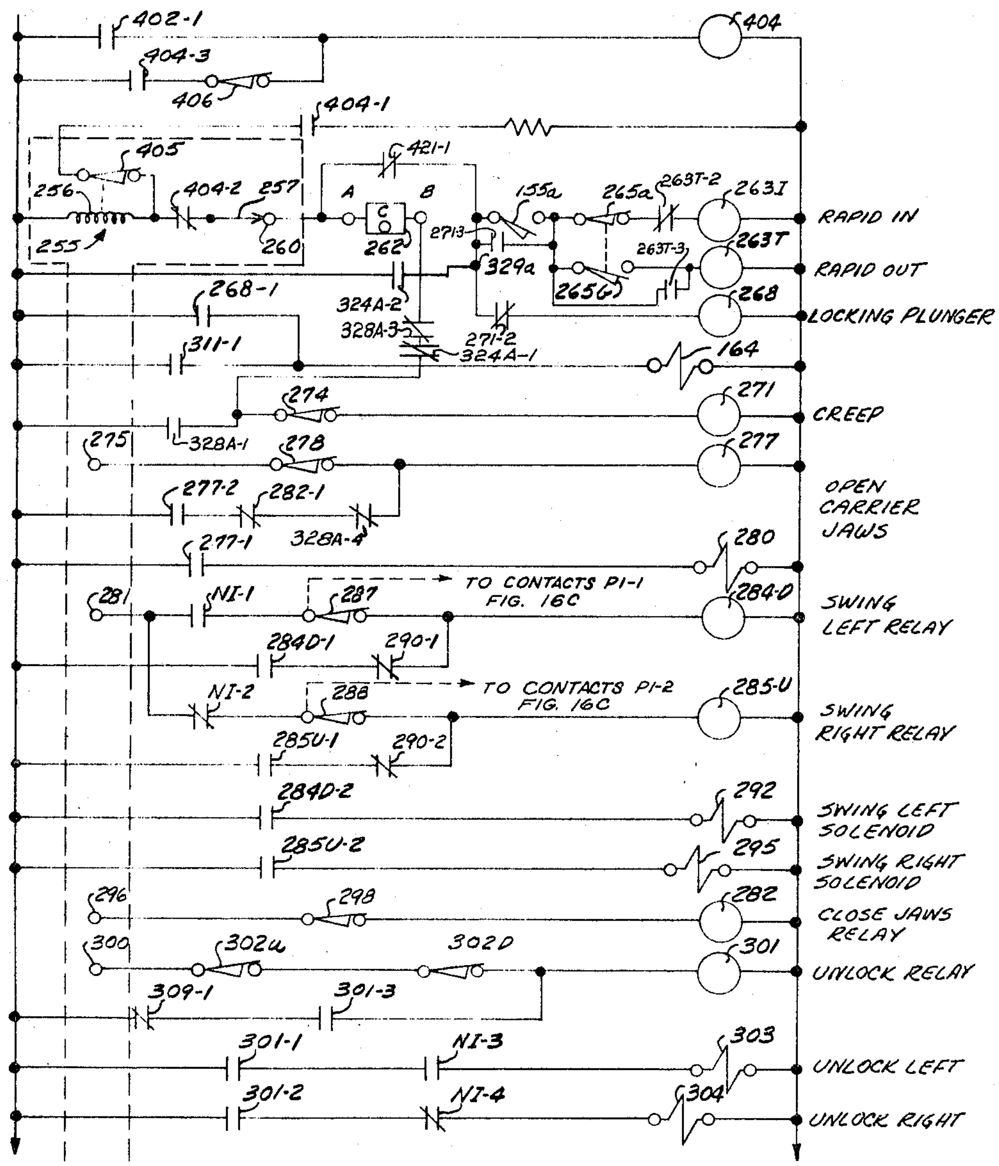
Figure 16B:
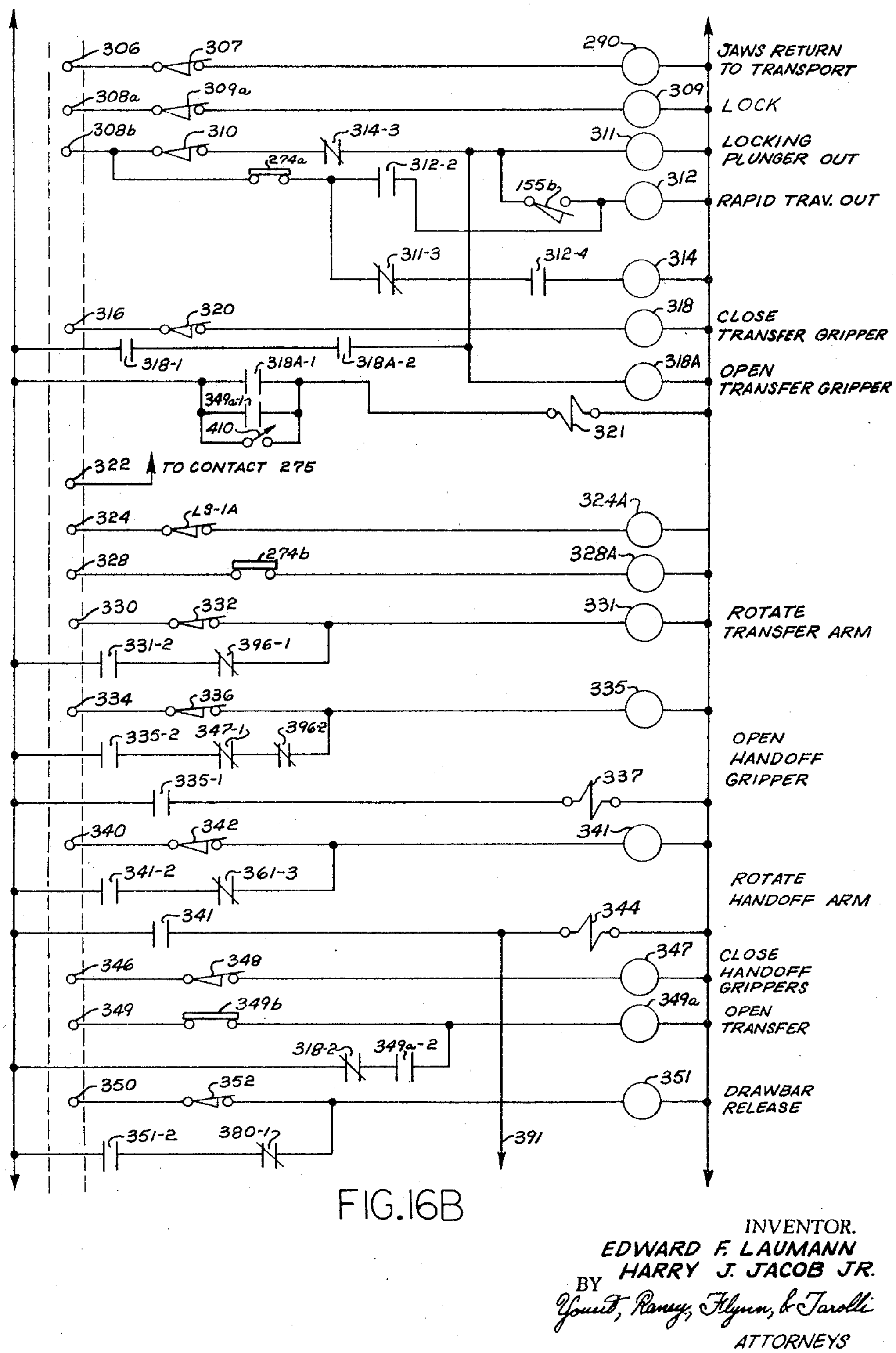
Figure 16C:
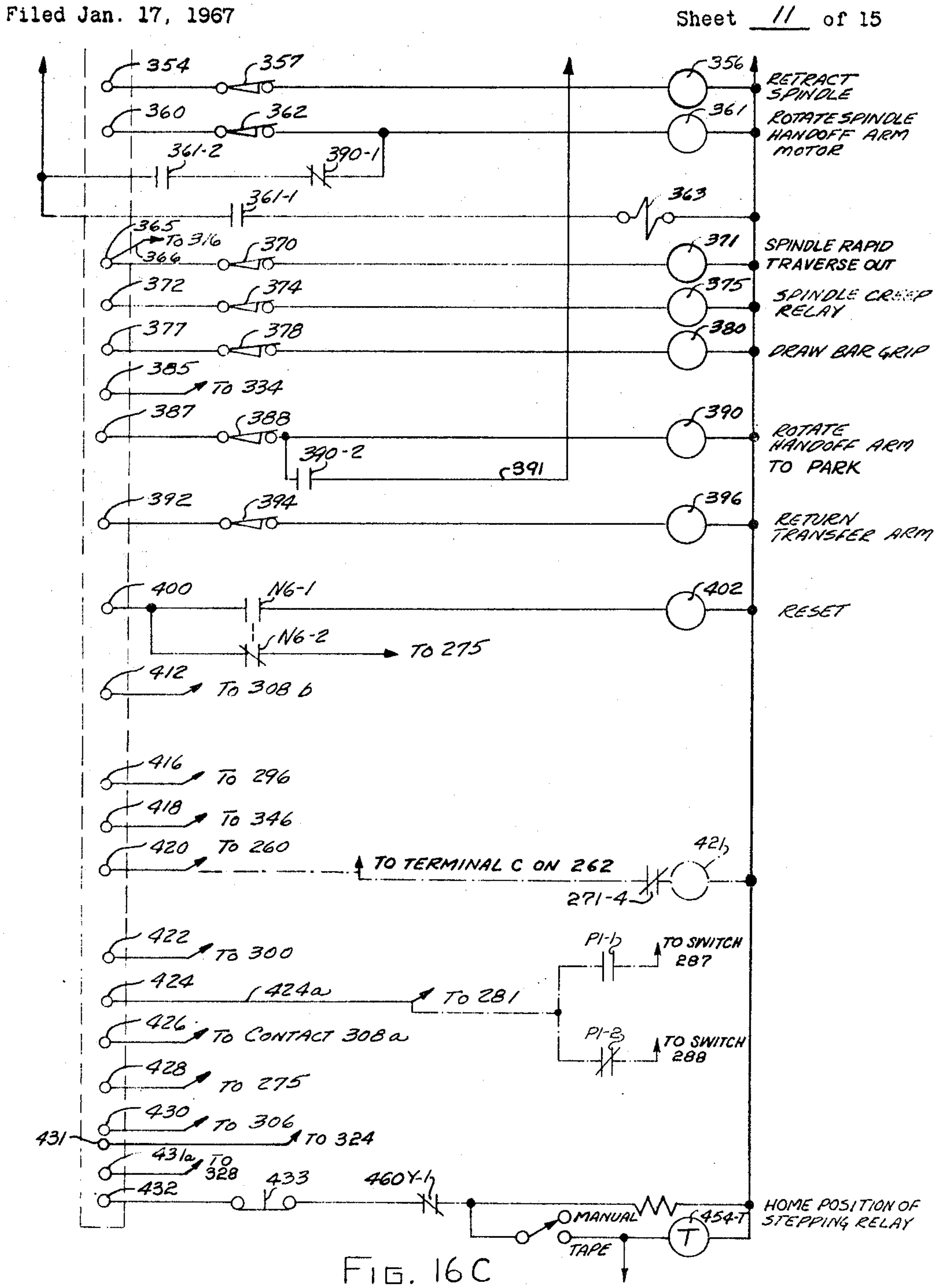
Figure 17:
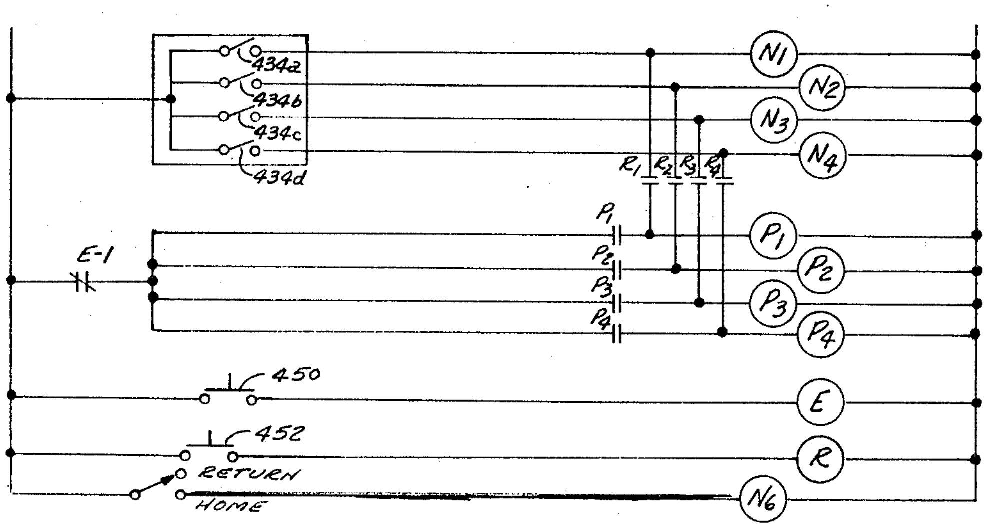
Figure 17:
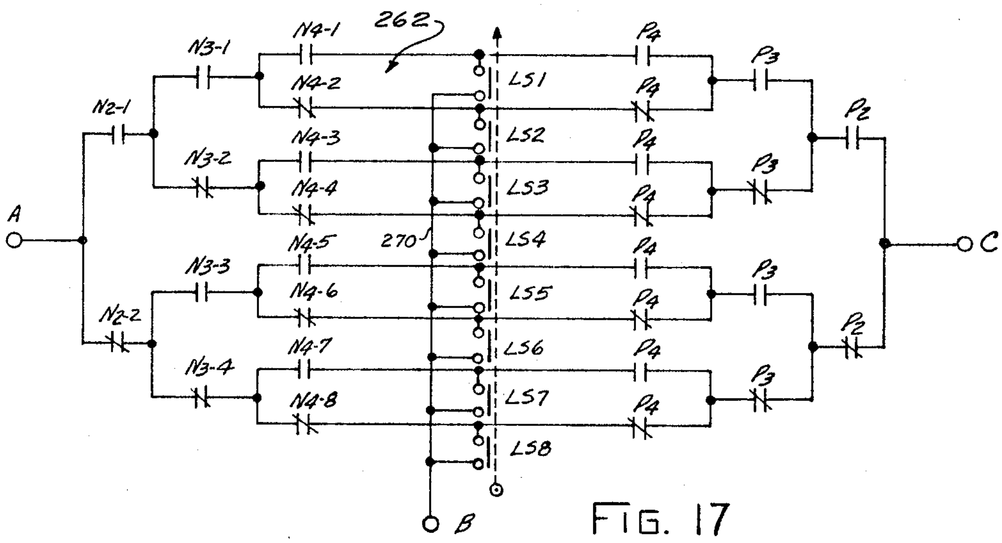
Figure 18:
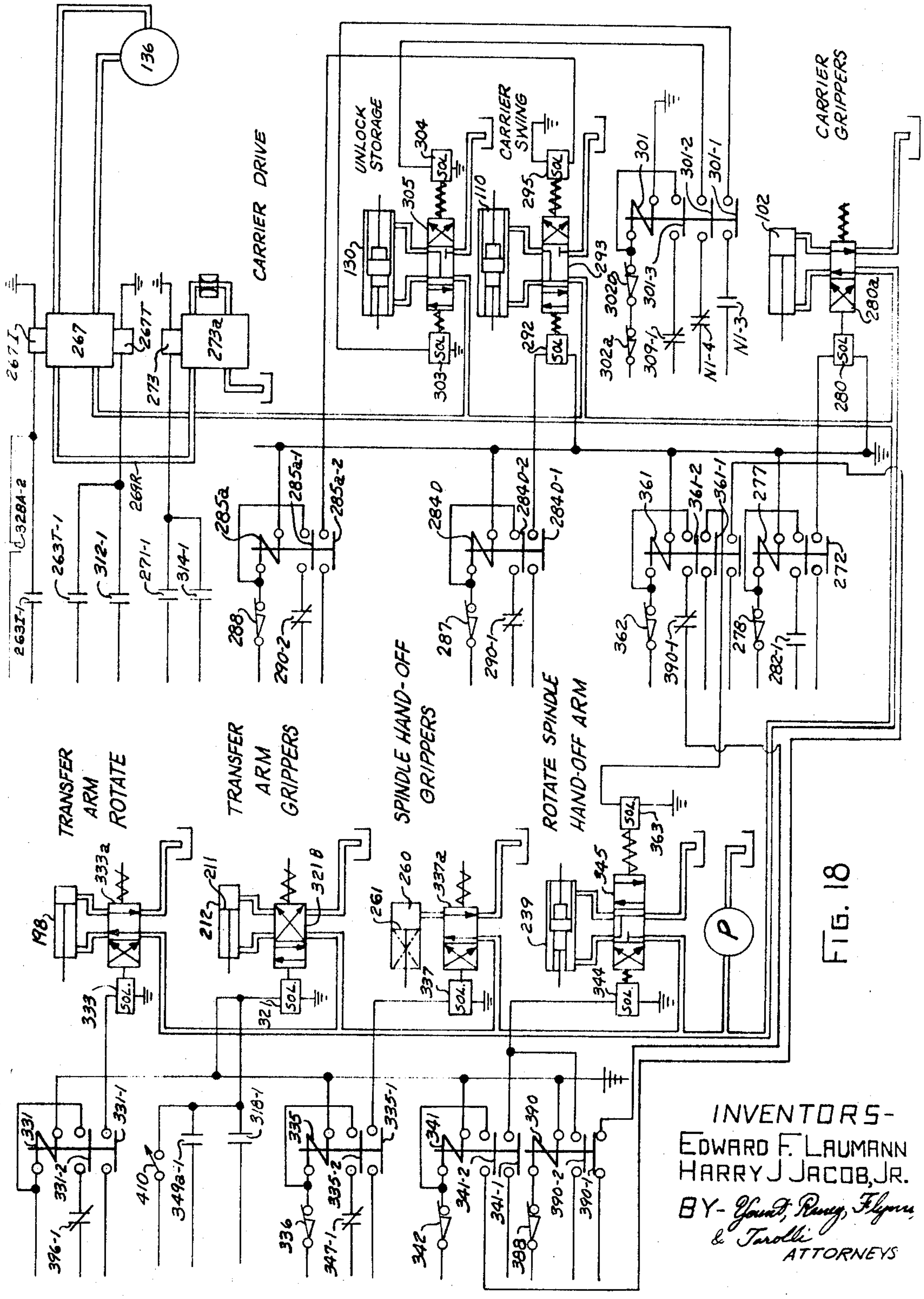
Figure 19:
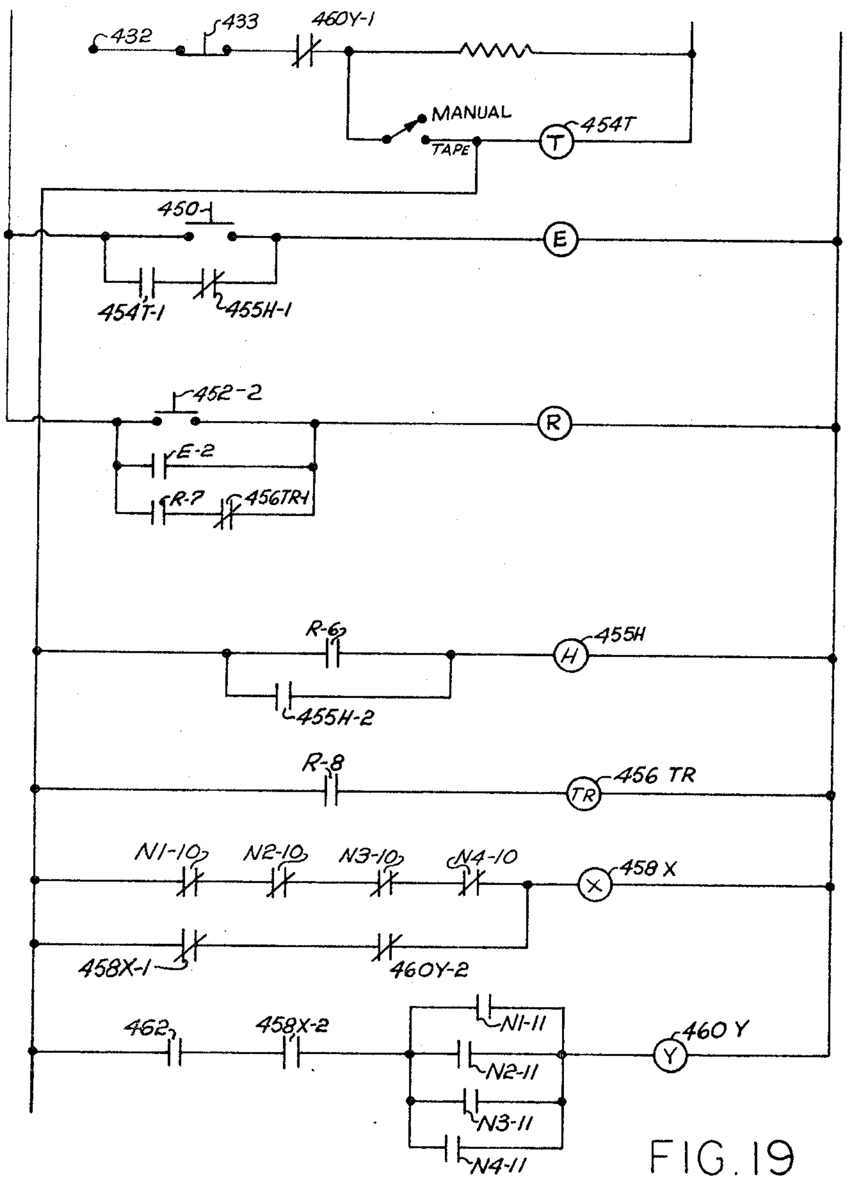
Figure 20:
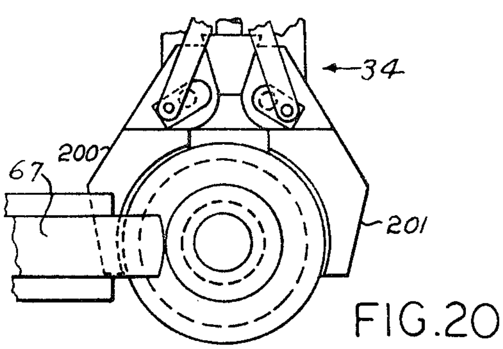
Figure 18A:
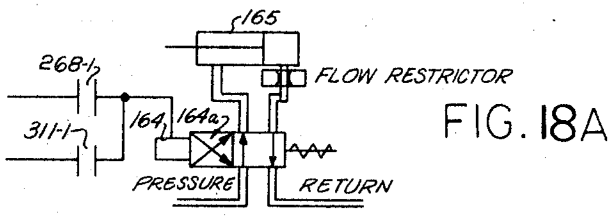
Figure 22:
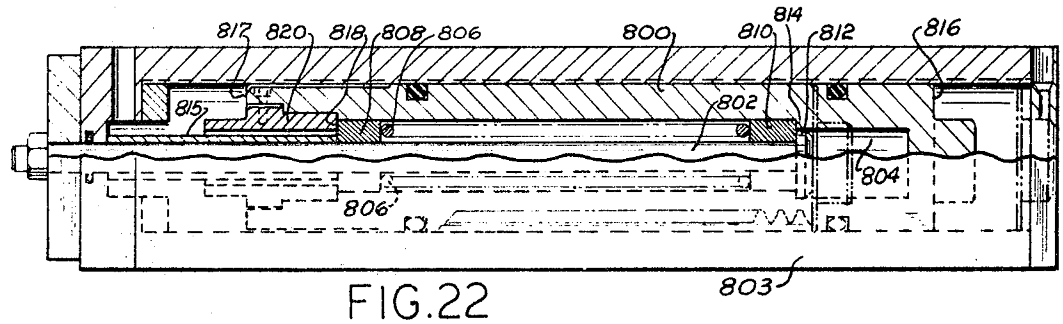
Figure 23:
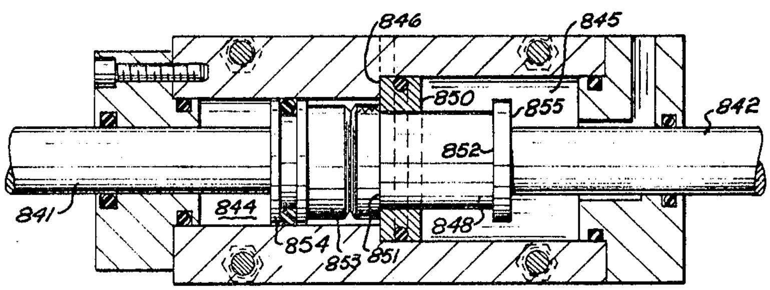

FIGS. 16A, 16B and 16C schematically indicate part of the circuit for controlling the tool changer disclosed;

FIG. 17 is the portion of the control circuit for the machine which operates to select the tool storage socket;

FIGS. 18 and 18A are a combined electrohydraulic diagram showing motors and controls therefor;

FIG. 19 is an electrical circuit diagram which may be used in tape operation;

FIG. 20 is an enlarged fragmentary view looking from approximately line 20—20 of FIG. 6 but with the carrier in a transfer position relative to the intermediate transfer arm;

FIG. 21 is a fragmentary view showing switch operating magnets on the tool carrier;

FIGS. 22 and 23 are views illustrating a type of motor which may be used in the described machine.

Figure 1:
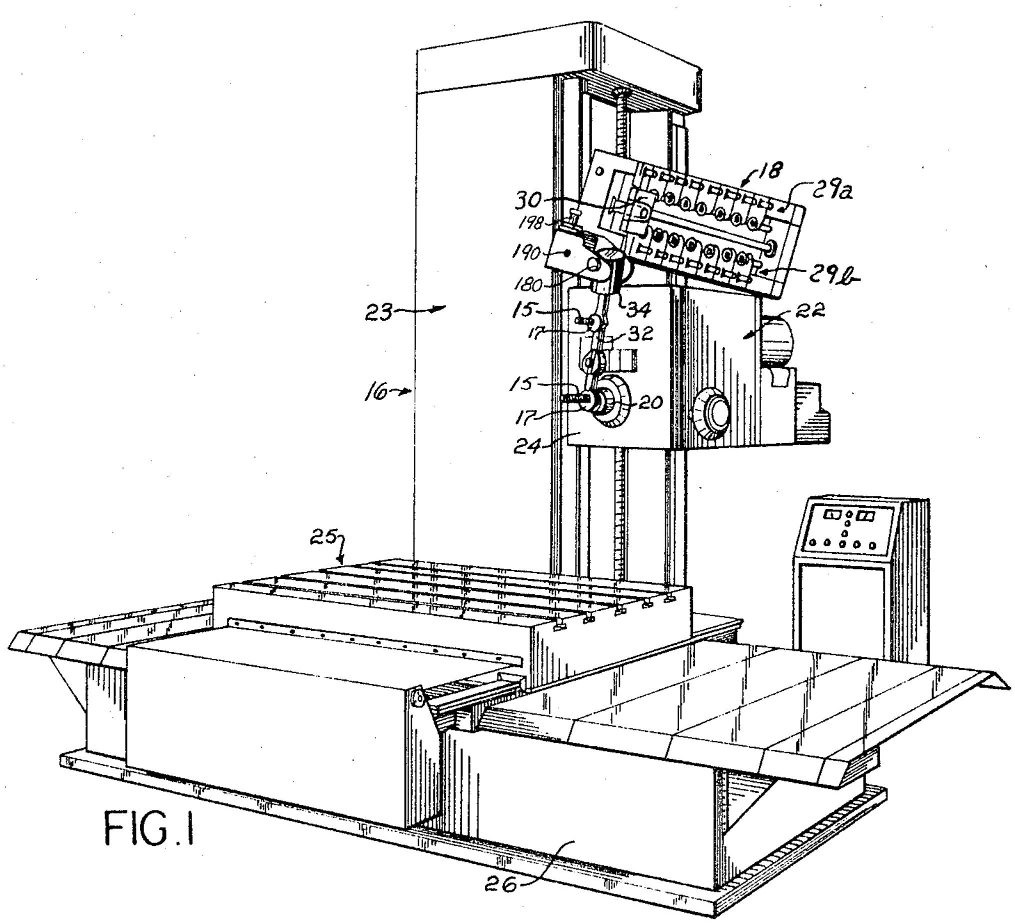
FIG. 1 is a view of a machine tool embodying the present invention.

In the illustrated and preferred embodiment of the present invention, tools 15 for use in a horizontal boring machine 16, are mounted in individual tool holders 17 which are stored in a storage magazine 18 mounted on the machine tool. The horizontal boring machine shown in FIG. 1 is of a conventional type and includes an axially movable horizontal rotatable spindle 20 rotatably supported in a spindle head 22 which is supported for vertical movement on a column 23 to position the spindle relative to a workpiece on a table 25. The spindle 20 projects from the spindle face 24 of the spindle head 22 and the table 25 is movable on a bed 26 to position the workpiece horizontally and transversely of the spindle axis. The spindle 20 has a conventional spindle socket for receiving a tool holder and a conventional draw bar mechanism, not shown, for gripping the tool holder and holding it in the spindle.

Figure 3:
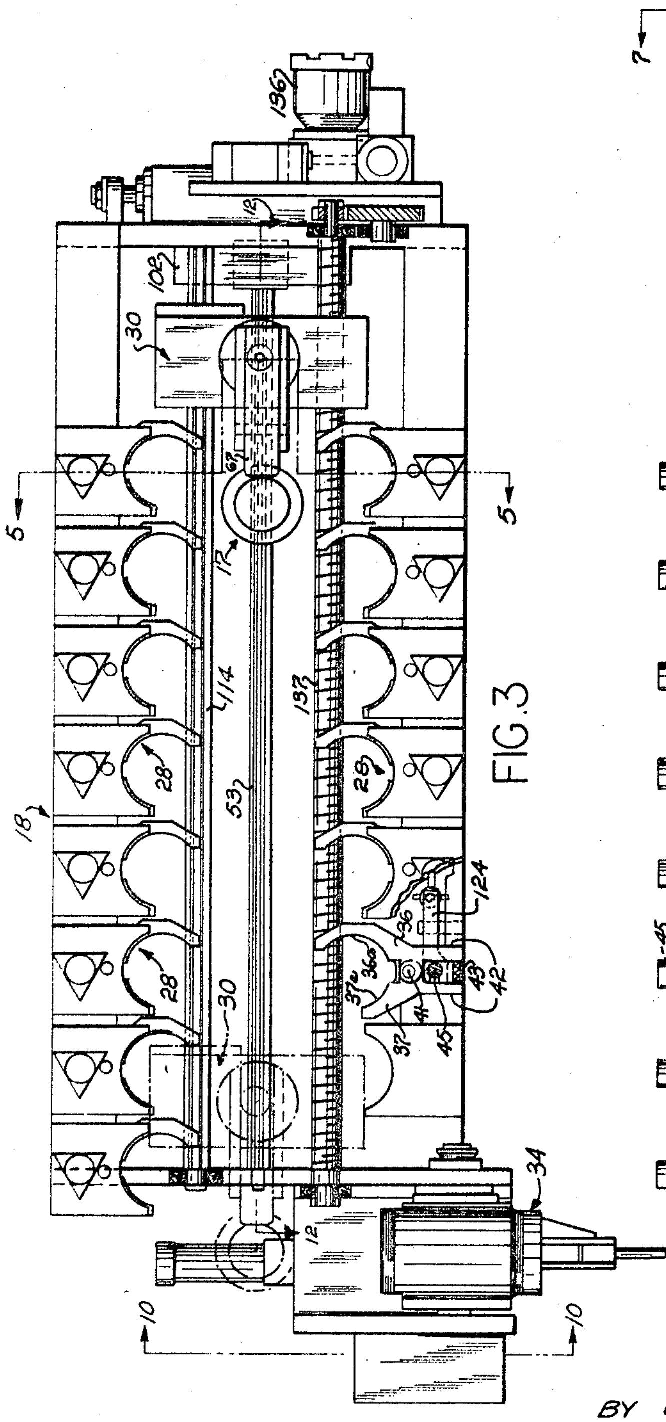
FIG. 3 is a view looking at the tool storage magazine from the right hand side of the spindle head as it is viewed in FIG. 1.

The tool magazine 18 is supported on top of the spindle head 22 and has a plurality of storage locations or sockets 28 (see FIG. 3) arranged in upper and lower horizontal rows 29*a*, 29*b* as shown in FIG. 1. Tools are transferred from the storage locations to a position in alignment with the spindle axis by a transfer mechanism including a carrier 30 for removing and returning tools from and to the the storage sockets 28, a spindle hand-off arm 32 for positioning a tool holder in alignment with the spindle socket and an intermediate transfer arm 34 for transferring tool holders between the magazine carrier 30 and the spindle hand-off arm 32.

Figure 4:
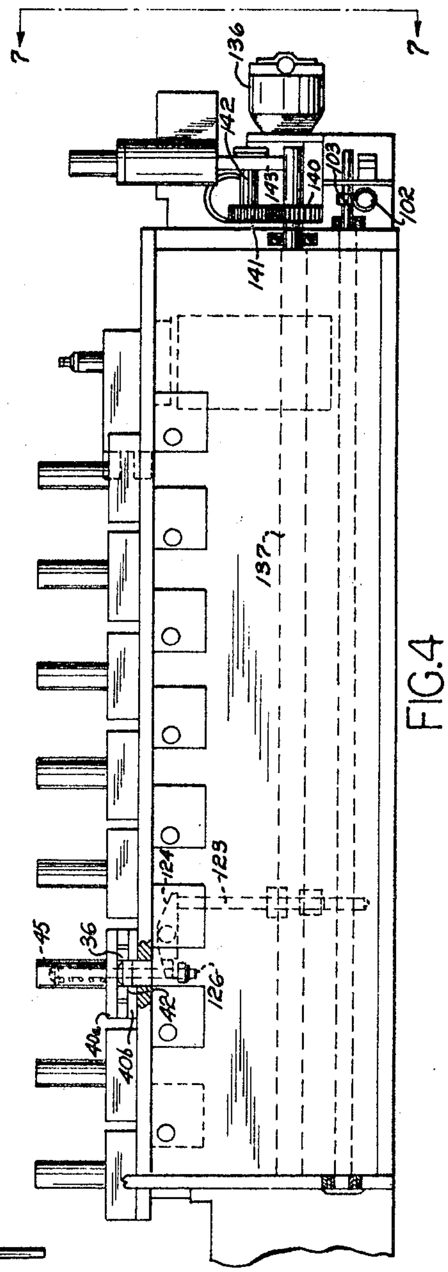
FIG. 4 is a plan view looking at the bottom side of the tool storage magazine as it is shown in FIG. 3.
Figure 5:
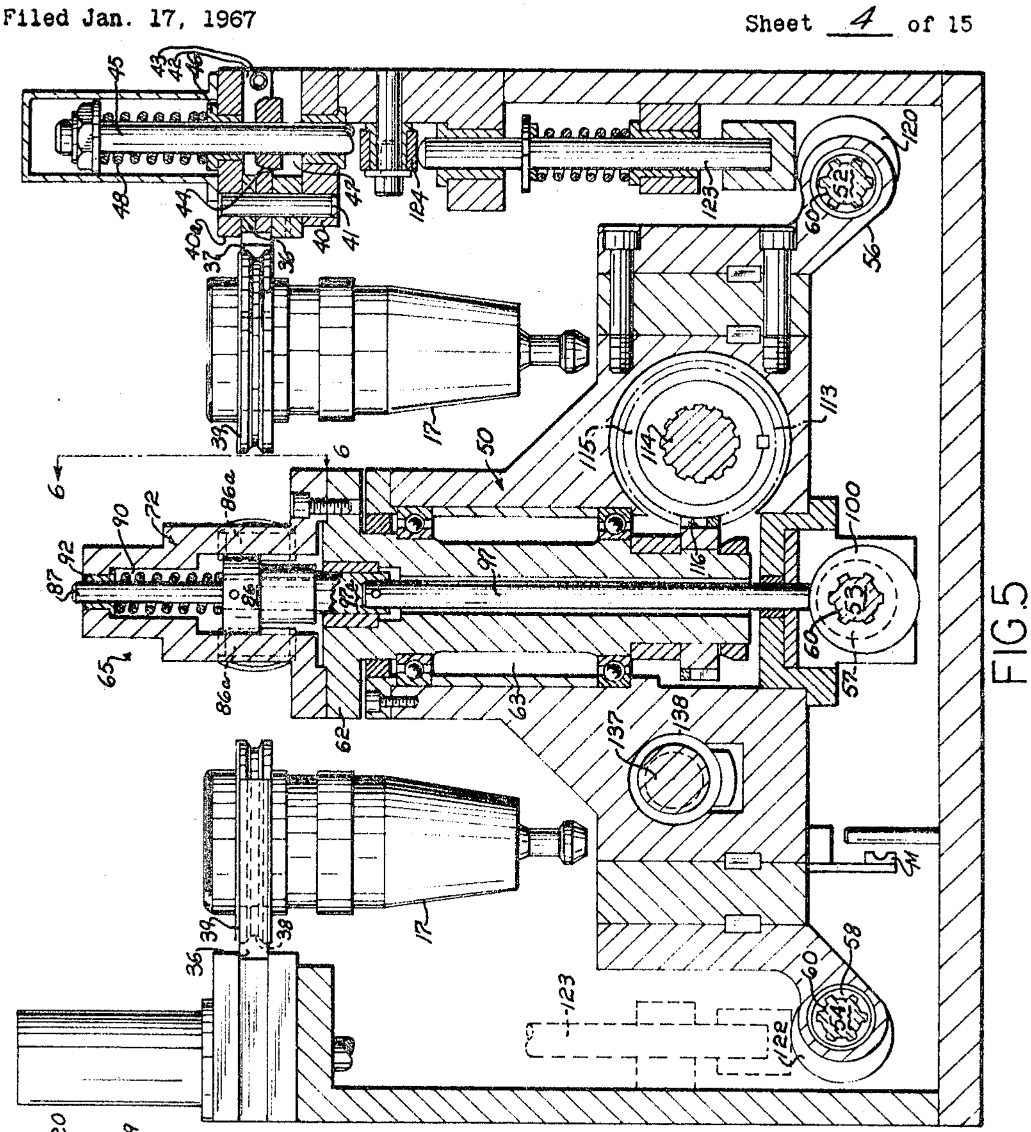
FIG. 5 is a cross-sectional view taken approximately along line 5—5 of FIG. 3.

Each storage location in the magazine 18 comprises cooperating locking arms 36, 37 (FIG. 3) each having arcuate finger portions 36*a*, 37*a* which define a storage socket for holding the tool holder. The finger portions seat in a groove 38 on a flange 39 on the tool holder (FIG. 5). The locking arms are disposed between cover plates 40*a*, 40*b* (FIG. 4) and are pivoted for movement about a pin 41 (FIGS. 3 and 5) extending between cover plates 40*a*, 40*b* to move between a position locking a tool holder in storage socket and a release position which allows a tool to be inserted into or removed from the socket. Each locking arm has an end portion 42 extending to the side of the pin 41 remote from the storage socket and a spring 43 is connected between the end portions 42 (FIG. 3) to urge the fingers about the pin 41 to engage the tool holder and hold the latter with slight pressure. A tapered cam 44 (FIG. 5) is disposed between the portions 42 of the locking arms and normally locks the locking arms in a gripping or locking position but is movable to allow the finger portions to be opened against the action of spring 43. The cam 44 is fixed to a shaft 45 which is reciprocable to move the cam 44 to effect the locking and releasing of the tool holder. The cover plates 40*a*, 40*b* having openings 46, 47 therein for receiving the shaft 45 with the latter extending outwardly of the plate 40*a* and the opening in the plate 40*b* being enlarged to also receive the cam 44. The shaft 45 is biased by a spring 48 in a direction outwardly of the plate 40*a* to bias the cam 44 to its position where it is disposed between the locking arms 36, 37 to hold the latter in their gripping and locking position. When the shaft 45 is moved axially inwardly, the cam moves so that the tapered portion will allow the arms to open against the action of spring 43.

The carrier 30 (FIG. 3) is disposed between the rows of storage sockets and is movable between the rows to deliver tool holders to the storage sockets and to remove tool holders therefrom. The carrier 30 includes a body member 50, see FIG. 5, which is supported for movement between parallel to the rows of storage sockets by three horizontal splined shafts 52, 53, 54 which are disposed generally vertically with respect to each other. The body member 50 has bearing portions 56, 57 and 58 which receive the shafts 52, 53, 54, respectively. Each of the bearing portions rotatably support a bushing member 60 which is splined to the shaft but is rotatable in the corresponding bushing portion to allow the splined shafts 52, 53 and 54 to rotate relative to the body member 50.

Figure 2:
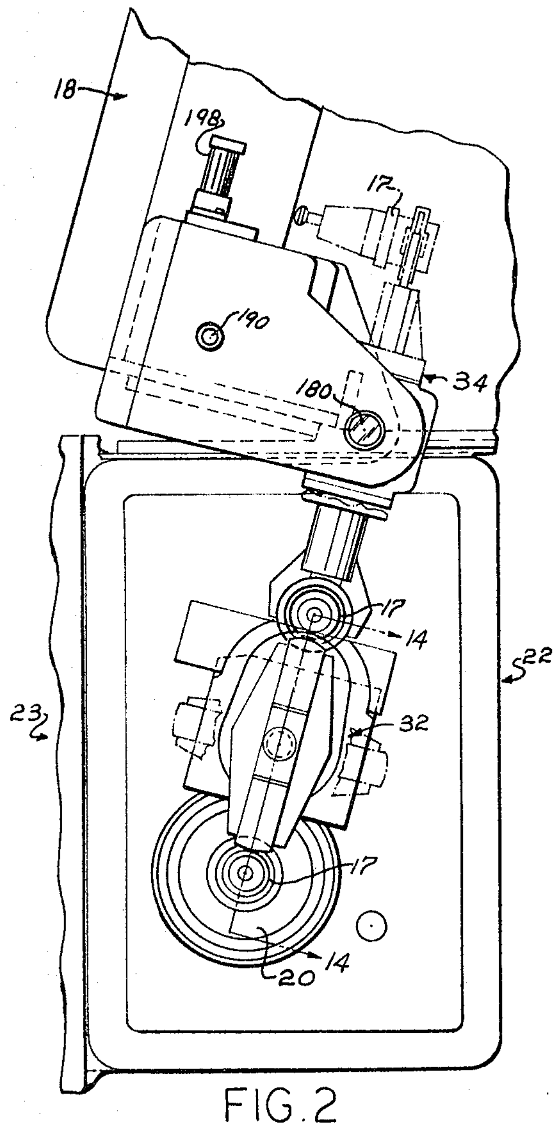
FIG. 2 is a view looking at the spindle face of the spindle head of the machine of FIG. 1, i.e., at the front side of the machine as it is viewed in FIG. 1.

The carrier 30 includes a spindle 62 which is rotatably supported in a bore 63 in the body member 50 (FIG. 5). The axis of the bore 63 extends generally parallel to the axis of the storage sockets and intersects the spline shaft 53. A tool holder gripping device 65 is mounted on the outer end of the spindle 62 and the spindle is rotatable to move the tool holder gripping device between a position where it is adapted to grip a tool in a storage socket 28 and a transport position shown in FIG. 2 where the carrier is adapted to transport the tool holder between the rows of the storage magazine to a position at the outer end of the magazine adjacent the spindle face of the spindle head 20 where the tool may be gripped by the intermediate transfer arm 32. The tool gripping device 65 has carrier jaws comprising a fixed gripping arm 66 (FIG. 6) and a movable gripping arm 67 adapted to grip the flange 39 on the tool holder 17. The fixed arms and the movable arm are mounted on outwardly extending portions 70, 71 of a support structure 72 fixed to the outer end of the spindle 62. The fixed arm 66 is fixedly mounted to the outwardly extending portion 70 while the movable arm 67 is pivoted by a pivot pin 74 to the outwardly extending portion 71. The inner ends of the gripping arms 66, 67 are biased toward each other by a spring 75 received in a bore in the movable arm 67 and abutting the bottom of the bore and the head on a pin 78 extending between the inner ends of the arms 66, 67 and fixed to the arm 66 but slidable relative to the arm 67. This spring 75 biases the gripping arm 67 to an open position. The arms 66, 67 are normally held in a closed or gripping position against the bias of a spring 75 by a cam 80 which is rotatably mounted in the frame structure 72 and which has a flat 81 that engages a rounded protrusion 82 on the inner end of the movable gripping arm 67. The flat 81 is also engaged by a finger 85 on a block 86 fixed to a shaft 87 supported in axial alignment with the axis of the spindle 62 by the frame structure 72. The block 86 and the shaft 87 are urged axially inwardly by a spring 90 encircling the shaft between the block 86 and the outed end of the shaft 87 with the outer end of the spring abutting a bushing 92 for supporting the outer end of the shaft 87. The spring 90 urges the finger 85 against the flat 81 on the cam to rotate the cam so that it urges the movable finger 67 about its pivot in a closing or gripping direction against the bias of spring 75. If the shaft 87 is moved outwardly of its position shown in FIG. 6, the finger 85 will move away from the flat 81 on the cam 80 to allow the spring 75 to move the gripping arm 67 in a counterclockwise direction about its pivot 74 to open the gripping device 65 and release a tool holder gripped thereby.

Figure 13:
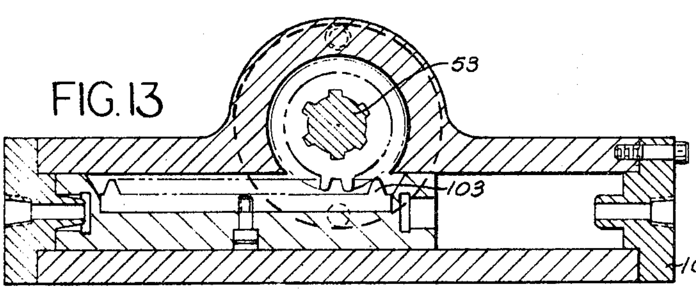
FIG. 13 is a sectional view taken approximately along line 13—13 of FIG. 12.
Figure 12:
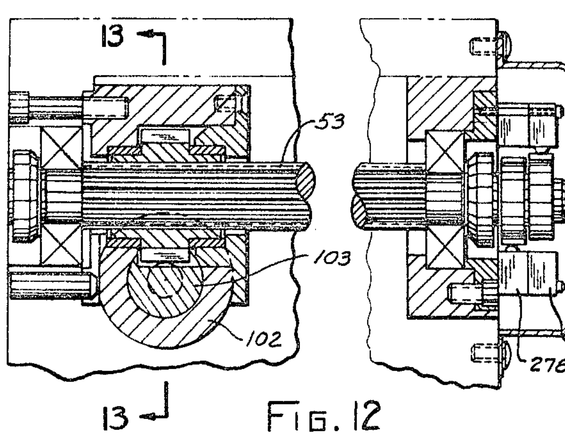
FIG. 12 is a fragmentary sectional view taken approximately along line 12—12 of FIG. 3.

The shaft 87 for controlling the cam 81 and in turn the gripping device 65 is supported in alignment with a rod 97 (FIG. 5) slidably supported in an axial bore in the spindle 62. The rod 97 is moved axially to move the shaft 87 outwardly of the support structure 72 by an eccentric 100 which is fixed to the bushing 57 and is rotated to operate the rod 97 on rotation of the splined shaft 53. The splined shaft 53 is rotated by the operation of a hydraulic motor 102 (FIGS. 12 and 13) mounted on the inner rearward end of the storage magazine and operating a rack 103 which meshes with a gear fixed to the adjacent end of the shaft 53. The hydraulic motor 102 is a double acting reciprocating motor and when it is energized to move in one direction, the rack 103 is moved to rotate the splined shaft 53 to cause the shaft 87 to move outwardly and to release the gripping arms 66, 67 and when moved in the opposite direction, the splined shaft 53 is rotated in the opposite direction to rotate the cam 100 to allow the spring 90 to move the shaft 87 and the block 86 inwardly to cause the cam 80 to operate the movable arm 67 of the gripping device to a gripping or holding position. In the illustrated embodiment, the movement of the shaft 87 is guided by the block 86 which has portions 86*a* which are received in guide slots in the support structure 72. Moreover, the rod 97 has a member 97*a* fixed to its end adjacent the shaft 87 which engages the inner end of the shaft 87 and the lower end of the block 86 to operate the shaft 87.

Figure 7:
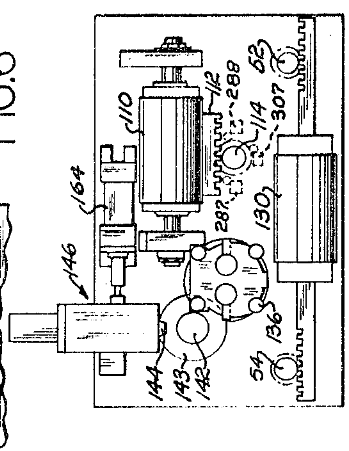
FIG. 7 is a view looking approximately from along line 7—7 of FIG. 4.
Figure 8:
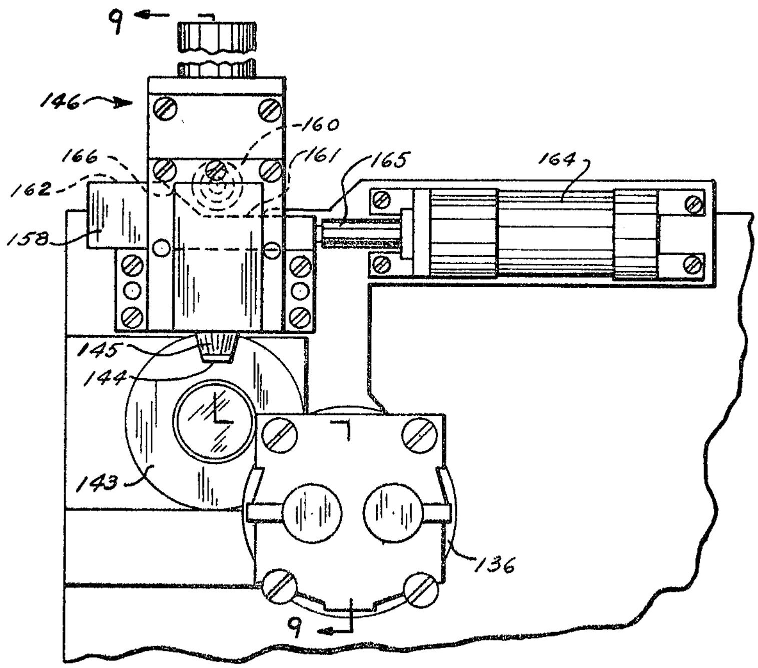
FIG. 8 is an enlarged view of a portion of FIG. 7 with parts removed.

The spindle 62 is rotated between right or left positions for gripping a tool holder in the storage and a transport position for transporting the tool holder between the rows of storage locations by the operation of a hydraulic motor 110, see FIG. 7. The hydraulic motor 110 is a double acting motor which operates a rack 112. The motor 110 is a conventional type reciprocating motor which when fluid pressure is supplied to both ends assume an intermediate position and is moved in one direction from the intermediate position to swing the gripping device 65 toward one row of the storage sockets by application of pressure to one end only and in the opposite direction from the intermediate position to swing the gripping device to the other row of storage sockets by application of pressure to the other end only. When pressure is connected to one end only, the other side is connected to drain. The gripping device 65 may be described as swinging to the right and to the left of the transport position shown in FIG. 3 to swing up and down to the upper and lower storage rows respectively. The rack 112 meshes with a gear 113 fixed to a shaft 114 which extends horizontally between the rows of storage sockets and passes through the body member 50 of the carrier 30. A helical gear 115 (FIG. 5) is splined to the shaft 114 and is constrained to move with the body member 50 along the shaft. The helical gear 115 meshes with a cooperating gear 116 fixed to the spindle portion 62 and when the hydraulic motor 110 is rotated in one direction from its intermediate position, the gear 115 and in turn gear 116 are rotated to cause the spindle 62 to swing right and when moved in the opposite direction from its intermediate position, the gear 115 and the gear 116 are rotated to cause the spindle to swing the gripping device 62 to the left. Thus the gripping device may be swung up or down from its transport position to insert tool holders into or remove tool holders from the rows of storage sockets in the magazine on either side of the carrier 30.

When the carrier 30 is in position to deliver a tool holder to a storage socket or to remove a tool holder from a storage socket, it is necessary to release the locking arms for movement to their open position to allow the gripping device 65 to move the tool into or out of the storage socket. The bushings 60, which are received in the bearing portions 56, 58 of the body member 50 of the carrier 30 and which respectively slidably receive the splined shafts 52, 54, have cams 120, 122 connected thereto for rotation therewith. The shafts 52, 54 are disposed adjacent the top and bottom respectively of the storage magazine, the right and left sides respectively, as the latter is viewed in FIG. 5.

Each storage location has a generally horizontal shaft or rod 123 associated therewith (shown as extending from top to bottom in FIG. 5) and when the carrier 30 is positioned to remove or insert a tool holder into a storage socket, the cam 120 is disposed adjacent the inner end of the rod 123. The rod 123 extends toward the open or outer side of the magazine to engage one end of a rocker arm 124 pivoted intermediate its ends to the frame of the magazine, see FIG. 4, and disposed so that the opposite end of the rocker arm from that engaged by the rod 123 is adapted to engage an abutment 126 on the inner end of the shaft 45 to which the cam 44 for controlling the locking arms 36, 37 of the storage socket is fixed. Consequently, rotation of the cam 120 to move the rod 123 outwardly of the magazine will cause the rocker arm 124 to move the shaft 45 inwardly to move the cam 44 out of engagement with the portion 42 of the locking arms 36, 37 releasing the arms 36, 37 for movement against the spring 43 to their release position. A rod 123 and a corresponding rocker arm 124 is provided for each of the storage locations and when the carrier 30 is in position to move a tool holder into and out of a storage socket, rotation of the spline shaft 52 will cause the cam 120 to be rotated to release the locking arms for the particular socket in the upper storage row.

Similarly, the shaft 54 is rotated to operate the rod 123 and rocker arms 124 associated with the locking arms 36, 37 in the other row of storage sockets to release the locking arms of the sockets.

The splined shafts 52, 54 are rotated by the operation of a motor in the form of a double acting cylinder 130 (FIG. 7) mounted on the inner end of the storage magazine 18 and having racks formed on rods extending from opposite ends of the hydraulic motor so that the motor when operated in one direction causes the rotation of the splined shafts 52, 54 in one direction and when operated in the other direction causes rotation of the shafts in the opposite direction. The motor 130 has an intermediate position in which the cams are positioned as shown in FIG. 5. If the shafts 52, 54 are rotated in one direction, the cam 120 will operate a rod 123 adjacent to lower side of the magazine while the cam 122 rotates in a direction which has no effect on the rods 123 for the upper storage sockets. However, if the motor 130 is reciprocated in the opposite direction, the cam 120 will be effective to operate a rod for the upper storage socket while the cam 122 will not be effective. The motor 130 is a piston cylinder actuator in which the piston assumes an intermediate position when fluid is applied to both sides of the piston and if pressure is applied to one side only and the other connected to drain the piston will move toward the end of the cylinder connected to drain.

Figure 9:
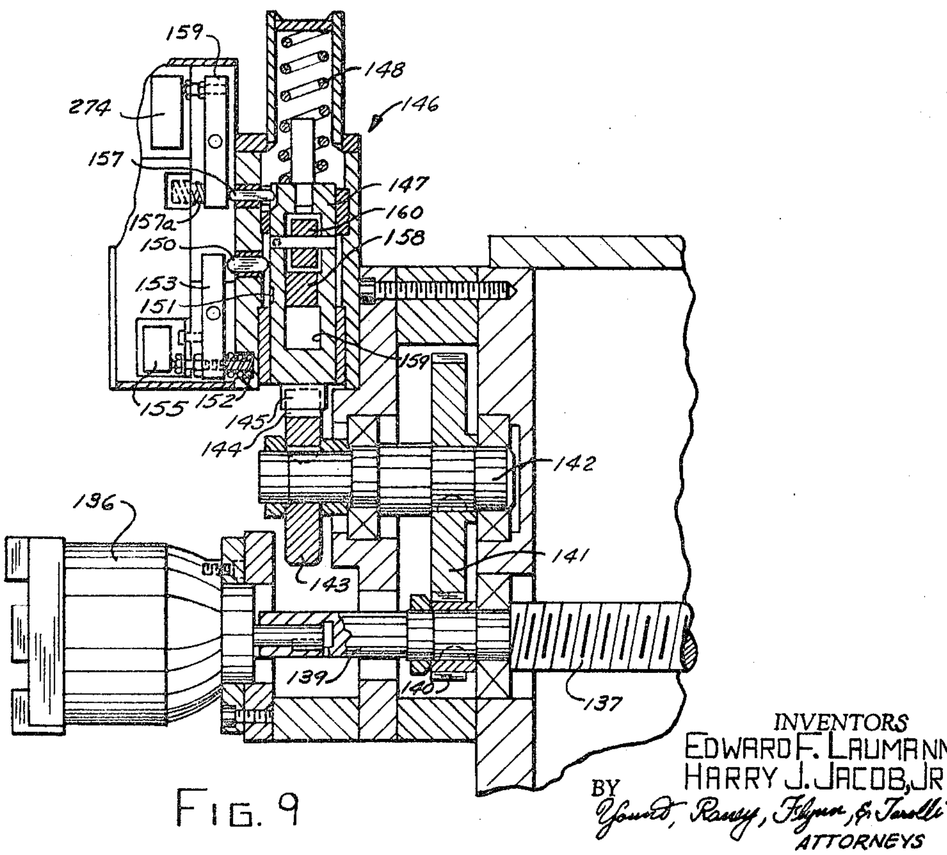
FIG. 9 is a sectional view taken approximately along line 9—9 of FIG. 8.

The carrier 30 is movable along the rows of storage sockets by operating a rotary motor 136. The motor 136 is mounted on the end of the storage magazine 18 remote from the spindle face and has an output shaft connected to drive a lead screw 137 journaled in the frame of the magazine 18 and extending parallel to the rows of storage locations (see FIG. 3). The lead screw 137 passes through the body member 50 of the carrier 30 and cooperates with a nut 138 fixed to the body member 50 and held against rotation with respect thereto. The motor 136 is a reversible motor so that the carrier 30 may be reciprocated along its path. Lead screw 137 has a reduced shaft portion 139 adjacent the motor 136 to which a gear 140 is fixed (see FIG. 9). The gear 140 meshes with a gear 141 fixed to a stub shaft 142 which has a disc 143 fixed to its outer end. The disc 143 has a slot 144 therein which is adapted to receive a pawl or shot-pin 145 on a plunger 147 of a plunger mechanism 146.

The plunger is biased to cause the pawl 145 to engage the slot 144 by a spring 148. When the plunger is moved against the action of the spring to clear the pawl 145 from the slot, a pin 150 is disposed to be received in a recess 151 in the plunger to allow a spring 152 to operate a rocker lever 153 about its axis to activate a switch 155 to signal that the pawl is clear of the slot. The plunger 147 also moves when the pawl 145 enters the slot 144 to allow a pin 157 and a spring **157*a* to operate a lever 159 about its pivot. The operation of the lever 159 actuates a switch 274 to signal that the pawl has entered the slot 144**.

The plunger 147 of the plunger mechanism 146 is moved against the bias of the spring 148 to withdraw the pawl 145 from the slot 144 by the operation of a cam bar 158 which extends through a slot 159 in the plunger 147 and is adapted to engage a roller 160 rotatably supported on a pin extending crosswise of the slot 159. The cam bar 158 has a low portion 161 and a high portion 162 and when the low portion 161 is opposite the roller 160, the spring 148 urges the pawl 145 into the slot 144. The cam bar may be reciprocated from this position to move the high part 162 of the cam bar 158 into engagement with the roller by energizing a solenoid 164, the solenoid 164 controlling a valve 164A for supplying fluid pressure to a piston cylinder fluid pressure actuator 165 connected to operate the cam bar 158. When the solenoid 164 is energized, the actuator 165 shifts the cam bar 158 to cause the roller 160 to ride up a cam portion 166 which joins the low part 161 and the high part 162 of the cam bar 158 to cause the plunger 147 to be retracted against the bias of the spring 148. The de-energization of the solenoid 164 causes operation of the actuator 165 to move the cam bar 158 outwardly to allow the spring 148 to again urge the plunger 147 to move the pawl 145 into the slot 144 if it is in position to receive the pawl.

The hydraulic motor 136 cannot rotate the lead screw 137 until the pawl 145 of the plunger mechanism 146 has cleared the slot 144 in the disc 143. The pawl 145 and slot 144 provide a positioning mechanism for accurately positioning the carrier at a position for effecting a transfer between the opposed storage sockets in the upper and lower rows of the magazine storage socket. The pawl 145 is in a position to be received in the slot 144 each time the carrier is at a transfer position and when the pawl 145 is received in the slot 144, the carriage is positioned to effect a transfer of a tool holder between the carrier and the storage sockets on either side thereof.

After the carrier has been operated to remove a tool from the storage socket, it may be moved by operation of the motor 136 to transport the tool to the outer end of the magazine 18 adjacent the spindle end of the spindle head. When the carrier 30 reaches the end of its travel, the movement thereof is stopped, by a limit switch or some other suitable control mechanism, in a position for the tool to be gripped by the intermediate transfer arm 34 (FIG. 1).

Figure 10:
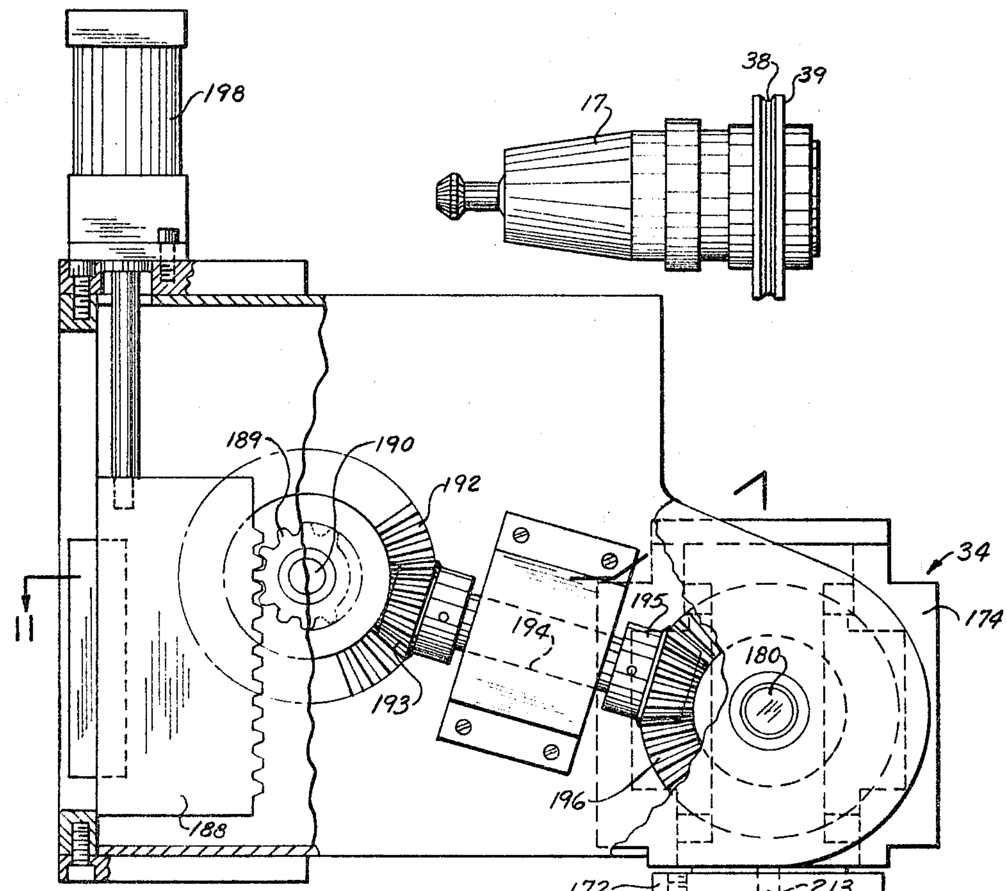
FIG. 10 is a front view of the front end of the tool storage magazine looking from line 10—10 of FIG. 3, with portions cut away, showing the intermediate transfer arm of the tool changing mechanism.
Figure 10:
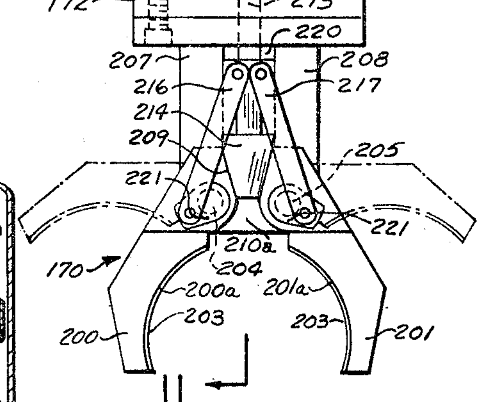
Figure 11:
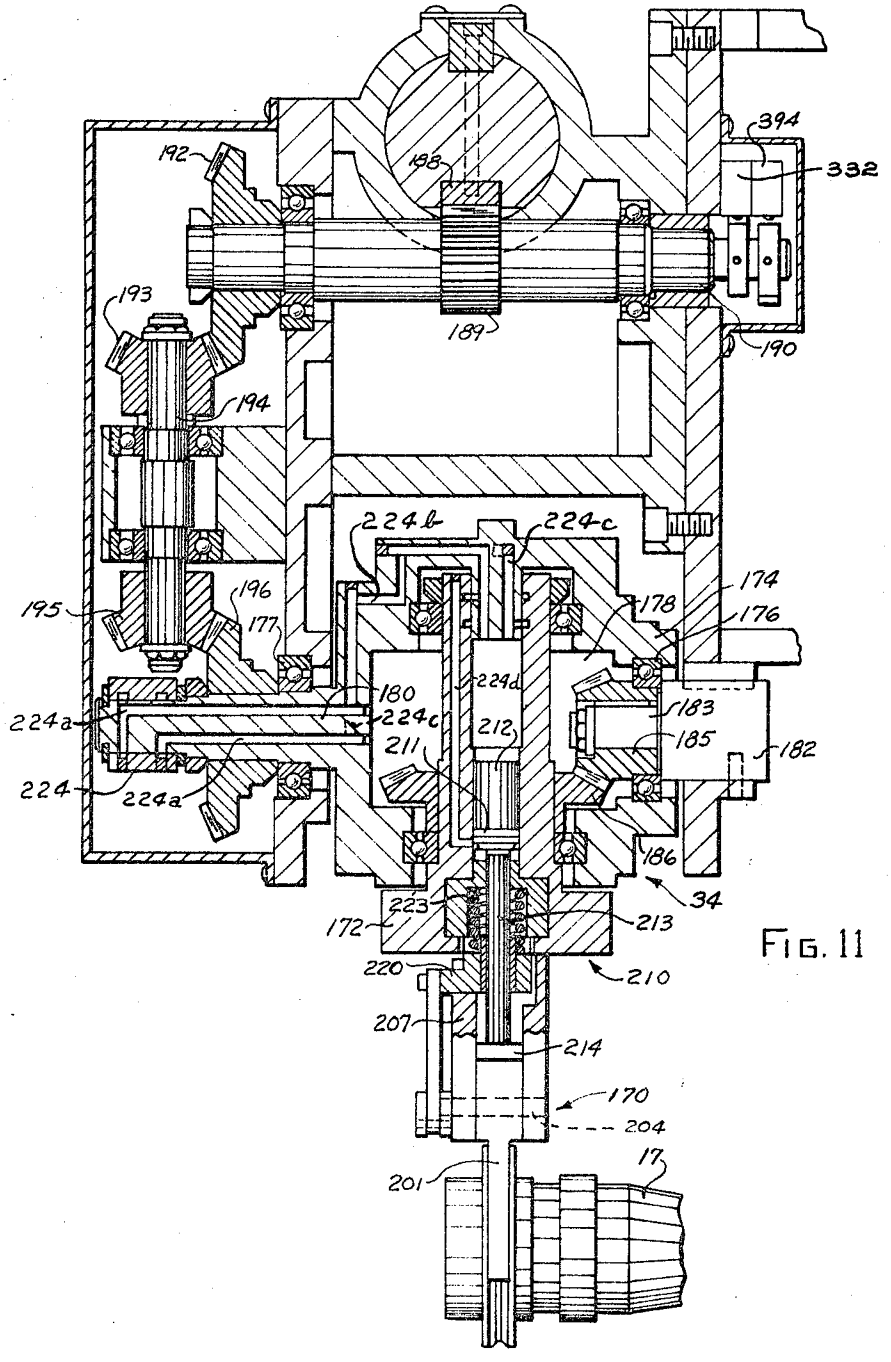
FIG. 11 is a sectional view taken approximately along line 11—11 of FIG. 10.

The intermediate transfer arm 34 is best shown in FIGS. 10 and 11. Referring to FIG. 10, a tool holder 17 is shown in a position in which it would be held by carrier 30 when the carrier is in a position to deliver a tool holder to the intermediate transfer arm 34. The intermediate transfer arm 34 itself is shown in its position for effecting a transfer of a tool holder between the intermediate transfer arm 34 and the spindle hand-off arm 32 (FIG. 1). The intermediate transfer arm 34 is movable from its solid line position for handling off to the spindle hand-off arm shown in FIG. 2 to a position for receiving a tool from the carrier 30 by swinging the arm about a horizontal axis which is perpendicular to the plane of the spindle face, the plane of the paper as the arm viewed in FIG. 10, and rotating the arm about its own axis by 90 degrees. FIG. 11 is a sectional view of the arm taken in a plane parallel to the spindle face and showing the intermediate transfer arm 34 in a position to hand off to the spindle hand-off arm.

The intermediate transfer arm 34 includes a gripping mechanism 170 which is mounted on a spindle member 172 rotatably supported in a support member 174 which is, in turn, rotatably supported for rotation about a horizontal axis transverse to and passing through the axis of the hollow spindle member 172. The axis of rotation of the support structure 174 is perpendicular to the plane of the spindle face so that the arm 34 swings in a plane generally parallel to the plane of the spindle face. As the intermediate arm 34 rotates about the horizontal axis of rotation of the support member 174, the transfer arm 34 is rotated about its own axis to change the angular orientation of the tool holder 17 gripped by the gripping device 170 relative to the spindle face. This angular rotation is provided since, when the tool holder 17 is transformed to the spindle hand-off arm 32, it is necessary that the axis of the tool holder be perpendicular to the plane of the spindle face, i.e., parallel to the axis of the spindle when it is to be picked up by the spindle. The carrier 30, however, delivers a tool holder to the transfer arm in an orientation where the holder axis is transverse to the spindle axis.

The support structure 174 is supporter for rotation about a horizontal axis in a plane parallel to the spindle face by bearings 176, 177 which are disposed at opposite sides of the support structure 174. The bearing 176 is received in a horizontal bore in the support structure while the bearing 177 is mounted on a horizontal shaft portion 180 formed as a part of the support structure 174. The bearings 176, 177 are ball bearings and the bearing 176 is received in a bore in the support structure 174 and has its inner race mounted on a stub shaft 182 supported by a frame member on the spindle head and having a reduced inner portion 183 to which a bevel gear 185 is fixed. The bearing 177 is mounted on a projecting shaft portion of the support structure 174 and is received in a bore in a frame member mounted on the spindle head.

As the support structure 174 is rotated about its horizontal axis on the bearings 176, 177, the spindle member 172 is rotated about its axis by the fixed gear 185 which meshes with a bevel gear 186 fixed to the spindle member 172 so as to rotate therewith. The support structure 174 is rotated about its horizontal axis by operation of a rack 188 (FIG. 10), which meshes with a gear 189 fixed to a horizontal shaft 190 extending benerally parallel to the spindle axis. The shaft 190 has a bevel gear 192 (FIG. 11) fixed to one end thereof and the bevel gear 192 meshes with a cooperating bevel gear 193 on a vertical shaft 194. The shaft 194 is a rotatable shaft and has a bevel gear 195 fixed to its lower end which meshes with a bevel gear 196 on the shaft portion 180 of the support structure 174. Rotation of the bevel gear 195 by operation of the rack 188 and its cooperating gear 196 will effect rotation of the support structure 174. The rack 188 is reciprocated by a hydraulic motor 198 to effect a swinging of the intermediate transfer arm.

The gripping device 170 on the intermediate transfer arm 34 for gripping the tool holder 17 comprises gripping arms 200, 201 which are adapted to engage the opposite sides of the tool holder and to partially encircle the tool holder for somewhat more than half of its circumference. The arms 200, 201 have arcuate recessed portions **200*a*, 201*a* which correspond to the radius of curvature of the flange 39 on the tool holder 17 and the recessed portions 200*a*, 201*a* are each shaped to provide a tongue 203 which is received in the groove 38** in the tool holder.

The arms 200, 201 of the gripping device 170 on the intermediate transfer arm are fixed to pivot pins 204, 205 extending between, and rotatable in, spaced support members 207, 208 which constitute part of a supporting and guide structure 210 fixed to the outer end of the spindle 172 of the intermediate transfer arm. The support members 207, 208 are spaced to define an opening **210*a* into which inner portions 209 of the arms 200, 201 on the side of the pivot pins 204, 205 remote from the tongues 203 project. The space 210*a* is between the pivot pins 204, 205 and the pivot pins 204, 205 are connected to the arms intermediate the inner portions of the arms and the tongues 203**.

The arms 200, 201 are moved by pivoting the pivot pins 204, 205 in the support members 207, 208 to swing the arms between an open position shown in dotted lines in FIG. 10 to a closed position for gripping and securely holding a tool, the latter position being shown in solid lines in FIG. 10.

The arms 200, 201 are moved between their open and closed positions by the operation of a piston 211 which operates in an axial bore 212 in the spindle member 172 to form therewith a hydraulic motor. The piston 211 has a piston rod 213 which extends axially outwardly of the spindle member into the space **210*a* and a head or wedge member 214 is secured to the outer end of the piston rod 213 and is adapted to engage the arms 200, 201 and lock the arms in a closed position. The piston rod operates the arms 200, 201 between open and closed positions through a linkage comprising links 216, 217 connected between a collar 220 slidable on the piston rod 213 and crank arms 221 each fixed to one end of a respective of one of the pivot pins 204, 205. The link 216 is connected to the pivot pin to operate the arm 200 while the link 217 is connected to operate the arm 201. Normally, the collar 220 is urged outwardly to urge the arms 200, 201 to a closed position by a spring 223 which acts on the collar 220**.

When the piston 211 is operated to move the piston rod 213 inwardly of the spindle member by supplying pressure fluid to the rod end of the bore 212, the head or wedge member 214 will engage the collar 220 and move the 216, 217 to move rearwardly and open the arms 200, 201. collar against the bias of the spring 223 to cause the links As long as pressure is maintained on the rod side of piston 211, the arms will be maintained open but if pressure is removed from the rod side of the piston, the spring 223 will move the collar 220 to close the arms 200, 201. If pressure is then supplied to the head side, the side opposite the rod side of the piston 211, the piston will then be moved to cause the head 214 to move between the inner ends of the arms 200, 201, which are now spaced, to engage the latter and allow the spring to lock the arms in their closed position. The head 214 is tapered and the facing sides of the inner end portions 209 of the arms 200, 201 are shaped in a complemental manner so as to provide a tight grip and a secure lock. The pressure on the head end of the piston 211 will operate to hold the arms 200, 201 in a locked gripping position. However, if pressure is lost, the spring 213 will keep the arms 200, 201 closed. Hydraulic pressure is supplied to the piston and cylinder actuator formed by the piston 211 and the bore 212 of the spindle member from a gland 224 through passageways **224*a* in the shaft portion 180, passages 224*b* in the support structure 174, passages 224*c* in a projection of the support portion extending into the bore 212, and passages 224*d*** in the spindle member itself as shown in the drawings.

Figure 14:
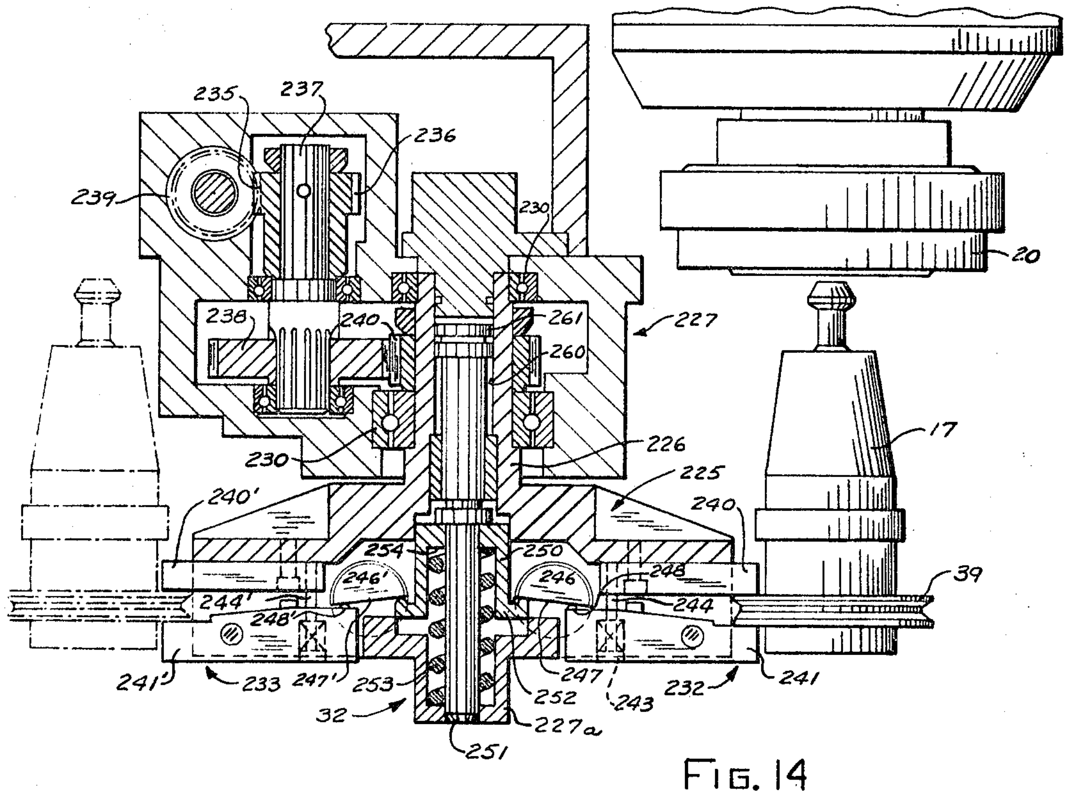
FIG. 14 is a sectional view taken approximately along line 14—14 of FIG. 2.
Figure 15:
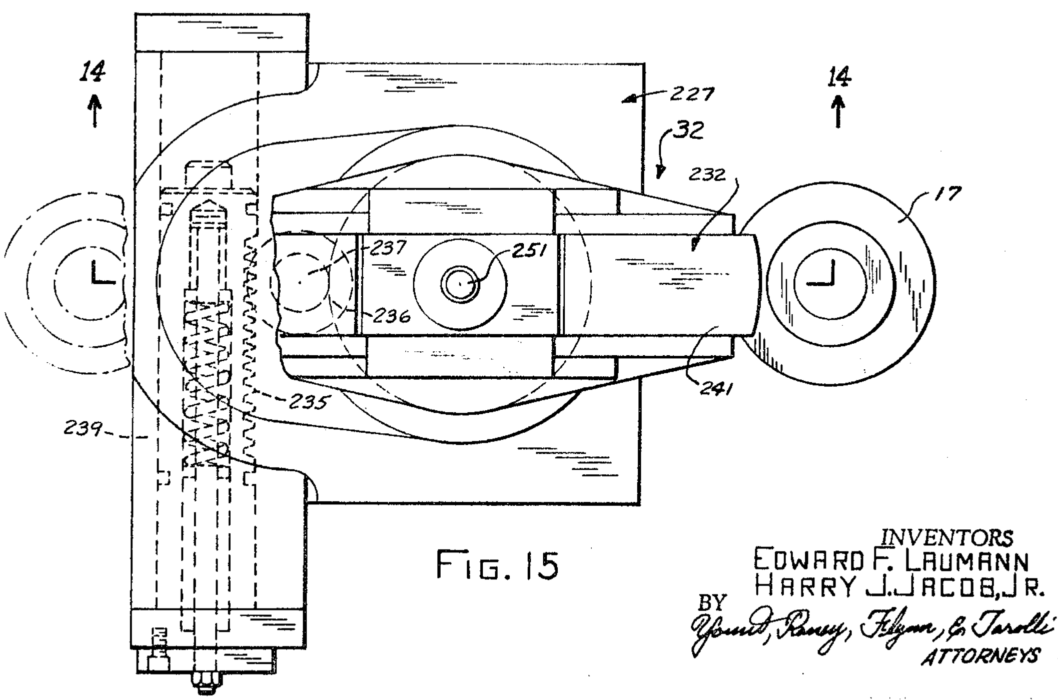
FIG. 15 is a plan view of the spindle hand-off arm looking at the under side of FIG. 14.

The spindle hand-off arm 32 (FIGS. 14 and 15) for taking the tool holder from the intermediate transfer arm 34 and positioning it in alignment with the spindle comprises a rotatable member 225 having a reduced spindle portion 226 which is rotatably supported by a frame structure 227 fixed to the spindle face of the spindle head. The spindle portion 226 is supported for rotation relative to the frame structure 227 by bearings 230 with the axis of the rotation being parallel to the axis of the spindle. The rotatable member 225 has two gripping mechanism 232, 233 which are diametrically opposed to each other and when one of the gripping mechanisms is in a position to support a tool holder gripped thereby in alignment with the spindle, the other tool holding mechanism is in a position to receive a tool holder from the intermediate transfer arm 32 or to transfer one thereto. The rotatable member 225 is rotated by a rack 235 which is supported for reciprocation by the frame structure 227. The rack 235 meshes with a gear 236 fixed to a horizontal stub shaft 237 (FIG. 14) rotatably supported by the structure 227 and having a gear 238 fixed thereto which meshes with a gear 240 fixed to the spindle portion 226 of the rotatable member 225. Movement of the rack in one direction will rotate the spindle hand-off arm 180 degrees to interchange the positions of the gripping mechanism 232, 233 and reciprocation in the opposite direction will cause rotation of the rotatable member 226 in the opposite direction to again interchange the positions of the gripping mechanism 232, 233.

In the preferred embodiment, the spindle hand-off arm has a park position from which it is moved in one direction of rotation to first position the hand-off arm to grip a tool holder held by the intermediate arm and one in the spindle and then 180 degrees in the opposite direction to interchange the tools. The direction of movement is then again reversed to return the arm to a park position. In this mode of operation, the gripping mechanism 233 always takes a holder from the intermediate arm to the spindle and the mechanism 232 always transfers tool holders from the spindle to the intermediate transfer arm. To accomplish this mode of operation, the rack 235 is formed integral with a piston member of a piston and cylinder motor 239 which has piston means which operates to move the spindle hand-off arm to one limit position when the rod end of the cylinder is connected to drain and the head end, i.e., the end opposite the rod end, connected to pressure, where the gripping mechanism 233 is adapted to grip a tool held by the intermediate arm and the gripping mechanism 232 adapted to grip a tool in the spindle, and a second limit position where the arm has rotated to interchange the gripping mechanisms 232, 233 when the rod end is connected to pressure and the head end to drain. The motor 239 also has an intermediate position corresponding to a park position for the spindle hand-off arm. The motor 239 in the illustrated embodiment has a spring which operates to hold the motor in an intermediate position, i.e. park position, when both sides of the motor are connected to drain.

The gripping mechanisms 232, 233 each comprise a pair of gripping arms or fingers which are substantially of the same construction as the gripping arms on the carrier 30. The mechanism 232 comprises a fixed arm 240 and a movable arm 241 which are adapted to grip the flange 39 on the tool holder 17. The movable arm 241 is pivoted for movement intermediate its ends and is biased to an open position by a spring 243 disposed in a bore in the arm. The spring acts between the bottom of the bore and the head of a pin 244 which is fixed in the arm 240 and extends through the bottom of the bore. The spring 243 urges the arm 241 to an open position and the arm 241 is moved against the bias of the spring 243 to a closed position by the rotation of a cam disc 246 having a flat 247 therein which engages a rounded protrusion 248 on the inner end of the movable arm 241.

The gripping mechanism 233 is the same as 232 and the corresponding parts have been given the same reference numerals with a prime affixed thereto.

The cam discs 246, 246′ are moved about their axis to move the movable arms 241, 241′ to a closed position by an operating member 250 which is disposed on a shaft 251 supported for axial movement in the frame structure 227. The operating member 250 has a pair of fingers 252 thereon which engage the cam discs 246, 246′ to effect rotation of the disc when the operating member 250 and the shaft 251 are moved inwardly of the support structure 226. The shaft 251 and the operating member 250 fixed thereto are biased inwardly to a position where the arms 241, 241′ are closed by a spring 253 which encircles the shaft 251 and has one end received in a bore 254 in the operating member 250. The other end of the spring 253 abuts a portion 227*a* of the frame structure 227. The shaft 251 extends inwardly the frame structure 227 from the operating member 250 and into a bore 260 in the spindle portion 226 of the rotatable member 225. The inner end of the shaft 251 has a piston 261 formed thereon and fluid pressure may be introduced between the inner end of the bore 260 and the piston head to cause the shaft to move outwardly against the bias of the spring 253 to move the fingers of the operating member 250 away from the cam discs 246, 246′ to allow the springs 243, 243′ to move the movable arms 241, 241′ about their pivots to an open position. When the pressure is removed from the piston 261, the spring 255 returns the arms 241, 241′ to a closed position. Consequently, it can be seen that the shaft 251 is reciprocable by a motor comprised of the piston 261 and the bore 260 to grip and release tool holders by operating the arms 241, 241′.

The mechanical operation of the foregoing structure may be briefly summarized as follows: a tool to be inserted into the spindle 20 is selected from the storage by operating the motor 136 to move the carrier 30 adjacent the storage socket containing the desired tool. When the carrier 30 is adjacent the socket, the gripping mechanism of the carrier is opened and swung either up or down by the operation of the hydraulic motor 110 to rotate the shaft 114 and the hydraulic motor 130 is operated to cause the release of the locking cam 44 for the particular socket. The hydraulic motor 130 operates through either the cam 120 or the cam 122 depending upon the tool holder selected to operate the corresponding push rod 123 to effect a release of the tool. The carrier arm is closed and then swung back to a transport position to pull the tool holder from the locking arms 36, 37 which are then locked. The carrier is moved to a position at the outer end of the magazine adjacent the spindle face of the spindle head where the jaws of the intermediate transfer arm 32 are opened and moved to grip about the flange 39 on the tool holder with an encircling grip. The carrier then releases the grip on operation of the push rod 97 to cause the gripping device 65 on the carrier gripping mechanism to move to an open position and the carrier is moved inwardly to clear the tool holder and the intermediate transfer arm. The intermediate transfer arm is then rotated about its horozintal axis and about its own axis to position the tool holder in a position where it can be received by the spindle hand-off arm. Preferably the intermediate arm is positioned for the handoff to the spindle hand-off arm prior to moving the spindle hand-off arm into position. The spindle hand-off arm may be swung to move the gripping mechanism 233 into proper position with the movable jaw 241′ thereof open. The jaws 241′ and 240′ will swing in planes parallel to the flange of the tool holders to grip it outwardly of the gripping mechanism 170. If a tool is also in the spindle and must be removed, the movement of the spindle hand-off arm to its position to receive a tool holder from the intermediate transfer arm will also move the gripping mechanism 232 into position to grip the flange 39 on a tool holder held in the transfer position by the spindle. The spindle is then retracted to clear the tool holder and when this is done the spindle hand-off arm is rotated to transfer the tool holder received from the intermediate transfer arm to a position in alignment with the spindle axis and to swing the tool holder gripped by the gripping mechanism 232 into position to be gripped by the intermediate transfer arm. When the gripping mechanism 232 is in position, the spindle moves forward to grip the tool holder and the intermediate transfer arm can then be operated to grip the tool holder to swing the tool holder into position to be gripped by the carrier gripping mechanism which may then operate to return it into the storage magazine. The spindle hand-off is returned to its neutral or park position when the intermediate transfer arm takes the returning tool.

A simplified control circuit for the tool changing mechanism described is shown in FIGS. 16A, 16B, 16C and 17.

Referring to FIGS. 16A–17, the electrical control circuit includes a stepping switch 255 for performing various functions in a sequence. The stepping switch includes a stepping coil 256 and a stepping contact 257 which is adapted to be stepped to a plurality of successive positions in which it bridges contacts individual to the position. The stepping contact 257 is stepped each time that the energization of the stepping coil 256 is broken. Therefore, in order to effect a stepping of the contact 257, the coil 256 must first be energized and then de-energized. As shown in FIG. 16A, a circuit for energizing the stepping coil 256 is completed through the stepping contact 257. Consequently, when a circuit is completed by the stepping contact 257, the stepping coil 256 is energized and when that circuit is broken the stepping coil 256 is de-energized to cause the stepping of the stepping contact 257 to the next set of contacts. When the stepping mechanism is in its first position, the stepping contact engages a contact 260 to supply power through the stepping coil 256 to a circuit for effecting operation of the carrier 30 to position it in a preselected tool transfer position adjacent a desired tool storage socket for removing a tool from either the upper or lower row of storage sockets. The tool selecting circuit includes a relay tree 262 which can be set to select the storage transfer position for the carrier 30 adjacent a desired socket and which has a terminal A connected to the contact 260 of the stepping switch and a terminal B at which an output occurs when the carrier approaches the transfer position which has been preset into the relay tree 262. Contact 260 of the stepping mechanism is also connected to energize a rapid traverse relay 263I or a rapid traverse relay 263T through the contacts **155*a* of the switch 155 which signals the clear position of the locking plunger 147 for the carrier drive motor. The relays 263I, 263T have contacts in circuits for energizing respective solenoids 267I, 267T of a solenoid valve 267, see FIG. 18, for operating the motor 136 in different directions at a rapid traverse rate unless a solenoid 273*a* of a solenoid valve 273 is energized (FIG. 18) and then the operation is at a creep rate. The relay 263I has contacts 263I–1 which cause the carrier drive motor to operate to move the carrier into the storage and the relay 263T has contacts 263T–1** which cause the carrier to move out toward the spindle face.

When the stepping contact engages the contact 260 the rapid in relay 263I is energizable through a switch **155*a* and a switch 265*a*. The switch 265*a* is normally closed and the switch 155*a* is, as mentioned above, closed when the locking plunger 147 is moved to withdraw the pawl 144 from the slot 145 to allow the operation of the carrier drive motor 136. The locking plunger 147 is withdrawn when the stepping contact 257 engages the contact 260 by the energization of a locking plunger relay 268. The locking plunger relay 268 has contacts 268–1 in a circuit for energizing the solenoid 164 of the solenoid valve 164*a* for supplying fluid pressure to the hydraulic cylinder for moving the locking plunger clear of the slot. When the locking plunger clears the slot 145, the switch 155*a* is closed and the rapid traverse in relay 163 is energized to close its contacts 263I–1 in a circuit for energizing the solenoid 267I of the solenoid valve 267. When the solenoid 267I is energized, fluid pressure is supplied to cause the motor 136 to operate in the proper direction to move the carrier 30 into the magazine and the return from the motor is connected through the valve 267 to a return line 269R from the valve 267. The return line 269R is connected to drain or sump through the solenoid valve 273*a* which gives a direct unrestricted return to drain unless the solenoid 273 is energized, in which case the return is restricted. When the solenoid 273 of the valve 273*a* is not energized, the operation of the motor 136 is at a rapid rate and when the solenoid 273 is energized it is at a slow rate. If the location which has been preselected by the relay tree 262 is approached as the carrier 30 is moving into the magazine, an output on terminal B of the relay tree 262 will effect the energization of a creep relay 271 through a limit switch 274. The creep relay 271 has contacts 271–1 in a circuit for energizing the solenoid 273 of the solenoid valve 273*a*. The creep relay 271 also has normally closed contacts 271–2 in the circuit for energizing the locking plunger relay 278 and these contacts are opened to de-energize the locking plunger relay 268 causing the locking plunger to move inwardly to engage the periphery of the disc 143 and to seek the locking slot 145 as the disc is rotated by the motor 136. The inward movement of the locking plunger 147 to engage the periphery of the disc 143 causes the switch 155*a* to open to break the original circuit for energizing the rapid traverse in relay 263I. The circuit to the relay, however, is maintained through holding contacts 271–3 of the creep relay 271. The motor 136 now operates at a creep speed since the relays 263I and 271 are energized to in turn energize the solenoids 267I and 273 of the valves 267 and 273*a*, respectively. When the locking plunger moves into the slot 145, the switch 274 is opened to break the creep relay circuit. When the creep relay circuit is broken, the holding circuit for the relay 263I is broken and both the solenoids 267I and 273 are de-energized to stop the operation of the motor 136. The opening of the switch 274 also breaks the circuit through the stepping coil 256 and effects the stepping of the stepping contact 257 to engage the next contact 275** to perform the next operation of the sequence as it will be described hereinafter.

In describing the operation which occurred when the stepping contact 257 engaged the contact 260, it was assumed that the rapid traverse in movement of the carrier caused the carrier to approach the position set in the relay tree 262. If this position is not reached by the rapid traverse in movement, the carrier will, at the limit of its inward movement, open the limit switch **265*a* and close the limit switch 265*b*. The limit switch 265*b* is in series with the rapid out relay 263T and the closing of the limit switch 265*b* will energize this relay to close its contacts 263T–1 in the circuit for energizing the solenoid 267T of the solenoid valve 267 to cause the motor 136 to operate in a direction to move the carrier out of the magazine. The relay 263I is de-energized at this time by the operation of the switch 265*a* and, therefore, the motor reverses and starts to move the carrier out of the magazine to seek the position preselected by the relay tree 262. When the carrier reverses, the switch 265*b* will be opened and the switch 265*a* will be closed; however, the rapid out relay 263T has normally closed contacts 263–2 in the circuit for energizing relay 263I which prevent the relay from being re-energized and self-holding contacts 263T–3 which complete a holding circuit for the relay 263T. The carrier will now rapid traverse out until a signal appears at the terminal B of the relay 262. When this occurs, the creep relay 271 will be energized and the circuit will operate as in the case of the relay 263I** to cause the motor to operate at a creep speed and then to stop at the preselected location.

The relay tree 262 (FIG. 17) includes contacts of three relays N2, N3 and N4 which are connected to constitute a relay tree. The relay N2 has normally open contacts N2–1 and normally closed contacts N2–2; relay N3 has normally open contacts N3–1 and normally closed contacts N3–2 connected in parallel circuits and in series with the normally open contacts N2–1 and normally open contacts N3–3 and normally closed contacts N3–4 connected in parallel circuits and in series with the relay contacts N2–2, the relay N4 having normally open contacts N4–1 and normally closed contacts N4–2 connected in parallel circuits and in series with the relay contacts N3–1, normally open relay contacts N4–3 and normally closed contacts N4–4 connected in parallel circuits and in series with the normally closed relay contacts N3–2, normally open relay contacts N4–5 and normally closed contacts N4–6 connected in parallel circuits and in series with the normally open contacts N3–3, and normally open contacts N4–7 and normally closed contacts N4–8 connected in parallel circuits and in series with the normally closed contacts N3–4. Each of the contacts of the relay N4 is connected by a respective normally open limit switch designated by the reference numerals LS1, LS2, LS3, LS4, LS5, LS6, LS7, LS8 to a common output connection 270 which is connected to the terminal B of the relay circuitry 262. Each of the limit switches LS1–LS8 are disposed so as to be actuated when the carrier 30 is approximately in respective tool transfer position adjacent a pair of storage sockets 28. The relay tree formed by the contacts of relays N2–N4 is such that only one of the switches LS1–LS8 will have power applied thereto from the terminal A for any combintaion of energization or de-energization of the relays N2–N4. For example, if no relays are energized, the only circuit completed by the tree is through the relay contacts N2–2, N3–4, and N4–8 and the limit switch LS8. If N2 is energized and relay N4 energized, the only circuit through the relay tree is through the relay contacts N2–1, N3–2 and N4–3 to the limit switch LS3. Consequently, if the particular limit switch which has the power applied thereto through the tree from the terminal A is closed, a potential will appear at terminal B to operate the creep relay.

The limit switches LS1–LS8 are disposed adjacent respective ones of the storage sockets and are opened when the carrier 30 approaches the storage sockets corresponding to the particular limit switch. The switches may be magnetic reed switches which are operated by a magnet on the carrier 30. There are two spaced magnets M on the carrier 30 (see FIG. 21). One magnet operates the switch on a transfer location when the carrier is approaching in one direction and the other operates the switch when the carrier approaches it in the opposite direction.

At the time a transfer position limit switch is operated to energize the creep relay, the creep relay 273 will cause the opening of switch **155*a*, which is part of switch 155, and the operation of motor 136 until the locking plunger 145 drops into the slot 144 at the precise transfer position. When this happens the switch 274 is operated to break the circuit through the stepping coil 256**.

The breaking of the creep circuit by the opening of the contacts of switch 274 causes the stepping mechanism to step one position to the next position where the stepping contact 257 will engage contact 275 to complete a circuit to energize a relay 277 through a limit switch 278 to open the grippers on the carrier 30. The relay 277 has normally opened contacts 277–1 in a circuit for energizing a solenoid 280 of a solenoid valve **280*a* to supply pressure to the motor 102 to cause the rotation of the shaft 53 to open the gripping arms of the carrier. When the gripping arms are open, the limit switch 278 is opened to break the circuit through the stepping coil 256 to cause the stepping mechanism to step to engage the contact 281. This does not de-energize the relay coil 277 since the relay coil 277 has self-holding contacts 277–2 which complete a circuit from the power supply, through relay contacts 282–1 of a jaw close relay 282, which operates to maintain the relay coil 277, solenoid 280 energized once they have been energized through the switch 278**.

When the stepping contact 257 steps to engage the contact 281, a circuit is made to energize either a relay coil 284D for swinging the carrier jaws down or a relay coil 285U for swinging the carrier jaws up depending upon whether selector relay N1 is energized or de-energized. If the selector relay N1 is energized, its normally open contacts N1–1 are closed to complete a circuit through a normally closed limit switch 287 and the relay coil 284D to energize the latter. If the relay N1 is de-energized, normally closed contacts N1–2 of the relay will complete a circuit from the contact 281 through a limit switch 288 to energize the relay 285U.

When the relay 284D is energized, it closes its normally open contacts 284D–1 and 284D–2. The contacts 284D–1 complete a circuit from the power supply through normally closed contacts 290–1 of a return relay 290 to maintain the relay 284D energized independently of the down limit switch 287. The closing of the relay contacts 284D–2 completes a circuit to a solenoid 292 for operating a valve 293 to supply pressure to the motor 110 to effect operation of the shaft 114 in a direction to swing the gripping arms on the carrier 30 downwardly, toward the lower row of storage sockets. As the carrier completes its downward swing, the limit switch 287 is operated to break the circuit through the stepping mechanism coil 256 to cause a stepping of the stepping contact 257 to the next contact 296. The breaking of the limit switch 287 does not, however, de-energize the solenoid 292 since the relay coil 284D is maintained by the holding circuit through its self-holding contacts 284D–1.

Similarly, if the relay coil N1 is de-energized so that the circuit completed by the engagement of the contact 281 is through the normally closed relay contacts N1–2 and the normally closed limit switch 288 to energize the relay coil 285U for effecting a swinging of the carrier toward the upper storage socket, the energization of relay coil 285U effects the closing of its contacts 285U–1 to complete a self-holding circuit for the relay through normally closed contacts 290–2 of the return relay 290. The energization of relay 285U also closes contacts 285U–2 to effect the energization of a solenoid 295 of the valve 293 for supplying fluid pressure to the motor 110 to swing the carrier jaws upwardly. As the carrier jaws complete their upward swing, the limit switch 288 is opened but this does not effect the energization of the relay coil 285U or the solenoid 295 because of the self-holding circuit maintained by the contacts 285U–1, but it will effect the stepping of the stepping mechanism 255 to bridge the next set of contacts 296.

The bridging of the next set of contacts 296 by the stepping switch causes the closing of the carrier jaws by energizing the jaw close relay coil 282 through a limit switch 298. The energization of the relay coil 282 causes it to open its contacts 282–1 in the holding circuit for the relay 277 for holding open the carrier jaws by maintaining open solenoid 280 energized. The de-energization of the open solenoid 280 on the opening of contacts 282–1 causes the valve controlled by this solenoid to reverse the supply and drain connection to the motor 102 to effect rotation of the shaft 53 and the closing of the jaws on the carrier under the influence of the spring 90. The closing of the jaws on the carrier opens the switch 298 and the circuit for energizing the relay coil 282 to break the circuit through the contacts 296 of the stepping switch to cause the stepping contacts 257 to be stepped to engage the next contact 300.

The engagement of the next contact 300 causes the energization of a relay coil 301 through normally closed limit switches 302U, 302D to effect the unlocking of the storage socket from which the tool is to be removed. The energization of the relay coil 301 effects the energization of a solenoid 303 or a solenoid 304 depending upon whether the relay N1 has been set to select the upper row or lower row of storage sockets. The solenoids 303, 304 operate a valve 305 for controlling the connection of the opposite sides of the motor 130 to pressure and drain, respectively. The relay coil 301 has normally open contacts 301–1 in series with normally open contacts N1–3 for energizing the solenoid 303 which effects supply of fluid pressure to the motor 130 to operate it to unlock the lower row of storage sockets and normally open contacts 301–2 in series with normally closed contacts N1–4, of the relay N1 for effecting energization of the solenoid 304 for controlling the unlocking of the upper row of storage sockets. The relay 301 also has a self-holding circuit made by contacts 301–3 of the relay 301 when the latter is energized. These contacts make a self-holding circuit through normally closed contacts 309–1 of a relay 309.

When the proper side has been unlocked in response to the energization of the relay coil 301, the limit switch 302U or 302 D is opened to break the circuit through the contact 300 of the steping mechanism to cause the stepping coil to step the stepping contact 257 to engage the next contact 306 of the stepping mechanism. These switches may be operated by a cam on one of the shafts operated by the motor 130.

The engagement of the contact 306 causes the energization of the relay coil 290 to effect a return of the carrier jaws to the transport position. The energization of the relay coil 290 opens its normally closed contacts 290–1 and 290–2 in the holding circuits for the relay coils 284D and 285U, one of which was energized to effect a swinging of the carrier. When these contacts 290–1, 290–2 of relay 290 are opened, the energized one of the relay coils 284D, 285U will be de-energized to de-energize the solenoid controlled thereby to operate the control valve for the motor 110 to cause the motor to return to its intermediate position to return the carrier arms to a transport position.

The return of the carrier jaws to their center position operates a limit switch 307 to break the circuit for energizing the relay coil 290 through the contact 306 of the stepping switch to, in turn, break the circuit through the stepping coil 256 to effect a stepping of the stepping contact 257 to engage the next contact **308*a* of the stepping switch. This contact makes a circuit through a switch 309*a* to energize a relay 309 to open its normally closed contatcs in the self-holding circuit for relay 301 which was energized to unlock the storage socket from which the tool has been removed. The de-energization of relay 301 causes the de-energization of solenoid of the control valve 305 which has been energized, solenoid 303 or 304**, to unlock the storage socket, and the return of the control valve to its neutral position which, in turn, causes pressure to be applied to both ends of the motor to cause the motor to assume its intermediate position and effect a locking of the storage sockets.

When the motor is in its intermediate position, the switch **309*a* is actuated to cause the stepping contact 257 to step and engage the next contact 308*b*. This completes a circuit through a limit switch 310 for energizing a relay coil 311 which has contacts 311–1 (FIG.16A) for effecting energization of the locking plunger solenoid 164 to effect a withdrawal of the pawl 144 from the slot 145 to allow rotation of the motor 136 for traversing the carrier 30. The circuit through the limit switch 310 is also adapted to energize a relay 312 to close its contacts 312–1 (FIG. 18) to effect a rapid traverse out operation of the motor 136 when the locking plunger is withdrawn to close contacts 155*b* of the limit switch 155 and signal the withdrawal of the plunger. The contacts 155*b* connect the relay coil 312 into the circuit with the limit switch 310. The energization of relay 312 also closes its normally open contacts 312–2 to provide a self-holding circuit for the relay coil from the contact 308*b* through contacts 274*a* of the switch 274. When the carrier reaches its intermediate arm transfer position, limit switch 310 is actuated to break the circuit for energizing the relay 311 to de-energize the solenoid 164 for retracting the locking plunger to cause the latter to move against the cam 143. The de-energization of relay 311 closes its contacts 311–3 to energize a creep relay 314 through now closed normally open contacts 312–4. This circuit is completed from contact 308*b* through the contacts 274*a* of switch 274** which is opened when the locking plunger enters the locking slot.

The energization of creep relay 314 causes its contacts 314–1 to close to complete a circuit for energizing solenoid 273 of valve **273*a* (FIG. 18) to cause operation of the motor 136 at a creep speed until the plunger enters the slot and opens the switch contacts 274*a* which are part of switch 274 to de-energize relays 312, 314. The de-energization of creep relay 314 when contacts 274*a* open causes the de-energization of the solenoid 273 and the de-energization of relay 312 de-energizes the rapid solenoid 267I. The creep relay also has normally closed contacts 314–3 in circuit for locking plunger relay 311** to assure that it it not re-energized during the creep operation.

The initial engagement of contacts **308*b* to energize the locking plunger relay 309 also energized a relay 318A to open the gripping mechanism 170 of the intermediate transfer arm. The relay 318A has normally open contacts 318A–1 in the circuit for energizing a solenoid coil 321 of a valve 321B which when energized operates the valve to connect the head end of bore 212 of the intermediate transfer arm to return and to supply pressure to the rod side of the piston to cause the gripping mechanism 170 to open to receive the tool holder 17. The relay 318A has selfholding contacts 318A–2** in a holding circuit.

The opening of contacts **274*a* when the carrier is moved into its transfer position for the intermediate transfer steps the stepping contact 318 to engage contact 316 to energize a relay 318 through a pressure switch 320 to close the gripping device 170 on the intermediate transfer arm. The relay 318 has normally closed contacts 318–1 in the circuit for energizing relay 318A for opening the grippers 170 so that the latter is de-energized on energization of relay 318 and the valve 321B operated to supply pressure to the head end of bore 212 and connect the other end to return to close gripping mechanism 170** onto the tool holder.

The switch 320 in the circuit for energizing the relay coil 318 is a pressure switch and when pressure has been built up in the head end of cylinder bore 212, the switch 320 opens to cause a stepping of the stepping contacts 257.

The stepping contact 257 next engages the contact 322 which completes a circuit to open the gripping jaws on the carrier 30 by energizing the relay coil 277. This circuit is broken by the operation of the limit switch 278 when the jaws are open and the stepping contact 257 is then stepped to engage the next contact 324 which energizes a relay 324A through a limit switch LS1–1A to cause the carrier to rapidly traverse into the magazine to a position adjacent the number one storage socket. The relay has normally closed contacts 324A–1 opening the circuit from the relay tree 262 and contacts 324A–2 for completing a holding circuit to a junction **329*a* between the plunger out switch 155*a* and locking plunger relay 268 in the circuit connected to stepping contact 260 of the stepping mechanism. This causes a rapid traverse into the magazine in the manner previously described. The limit switch contacts LS1–A are opened when the carrier 30 reaches a position adjacent the number one storage socket to break the energizing circuit through the contact 324 and to effect the stepping of the stepping mechanism 256 to the next contact 328 which is connected to energize a relay 328A for effecting operation of the motor 136 at creep speed until the locking plunger 147 engages on the locking slot 144**.

The relay 328A has normally open contacts 328A–1 (FIG. 16A) for energizing creep relay 271 through the switch 274 to operate creep valve **273*a* and normally open contacts 328A–2 for energizing the rapid in solenoid. When the switch 274 is opened as the locking plunger moves into the locking slot the relay 328A is de-energized by opening contacts 274B in series therewith and the stepping contact stepped to contact 330. The relay 328A also has normally closed contacts 328A–3 in the circuit between the switch 274 and the relay tree 262 to prevent energization of locking plunger relay 268 through the tree during the creep operation and contacts 328A–4 in the holding circuit for relay 277** for opening the carrier grippers.

When the stepping contact 257 engages the contacts 330, a relay coil 331 is energized through a limit switch 332 to effect a rotation of the intermediate transfer arm by the hydraulic motor 198 to rotate the arm to an interchange position to transfer a tool to the spindle hand-off arm. The relay 331 has contacts 331–1 in the circuit for energizing a solenoid 333 of a solenoid valve **333*a* controlling pressure fluid to the motor 198. When the intermediate transfer arm has swung to its position for handing off to the spindle transfer arm, the switch 332 is opened to break the circuit through the stepping contact 257 to cause the stepping of the stepping mechanism to engage the next contact 334 with the stepping contact 257. This does not cause the de-energization of the relay 331 since the relay has self-holding contacts 331–2** which maintain it energized.

When the contact 334 is engaged, a relay 335 is energized through a limit switch 336 to effect the energization of a solenoid 337 of a solenoid valve **337*a* for supplying fluid pressure to the piston cylinder actuator in the spindle hand-off arm for releasing the gripping devices 232, 233. The relay 335 has normally open contacts 335.1 which are closed to energize the solenoid 337 causing the valve 337*a* to supply fluid pressure to the bore 260 to operate the piston 230 to open the gripping devices 232, 233. The relay 335 also has self-holding contacts 335.2 which complete a holding circuit to the relay coil 335 independent of the stepping mechanism. When the gripping devices 232, 233 on the spindle hand-off arm are open, the limit switch 336 is open to cause a stepping of the stepping contact 257 to engage the next contact 340**.

The making of the contact 340 completes a circuit for energizing a relay coil 341 through a limit switch 342. The energization of the relay coil 341 closes its contacts 341–1 to energize a solenoid 344 of a solenoid valve 345 for effecting the supply of fluid pressure to the motor 239 for rotating the spindle hand-off arm from its park position to its position to grip a tool from the intermediate transfer arm and to grip one in the spindle, if such a tool is present. When the spindle hand-off arm is rotated to a position to grip the tool holder held by the transfer arm and to grip the tool holder in the spindle, the limit switch 342 is operated to break the circuit through the stepping mechanism to step the stepping contact 257 to its next position to engage contact 346. This does not, however, de-energize the relay 341 since it is maintained energized by a circuit through self-holding contacts 341–2. It will be noted that the gripping arms on the intermediate transfer arm are closed on the tool holder when the gripping fingers of the spindle arm move into position to grip the tool holder. The fingers on the spindle hand-off arm are open, however, and pass on opposite sides of the locking arms to grip the portion of the tool holder flange not encircled by the arms 200, 201.

The making of the contact 346 effects the energization of a relay coil 347 through a limit switch 348 to energize the relay to open normally closed contacts 347–1 in the self-holding circuit for energizing the relay 335 which has been energized to supply fluid pressure to maintain the spindle hand-off arms open. The opening of the contacts 347–1 deenergizes the solenoid 337 to connect the head side of piston 261 in the spindle hand-off arm to drain to allow the spring 255 to effect a closing of the gripping devices 232, 233 onto the flanges 70 of the tool holders.

When the gripping devices close, a switch 348 is operated to break the circuit through contacts 346 of the stepping mechanism and effect the stepping of the stepping contact 257 to the next set of contacts 349 to complete a circuit for energizing a relay coil **349*a* through a pressure switch 349*b* to open the intermediate transfer arm gripping mechanism 170. The energizing of relay 349*a* closes its contacts 349*a*–1 in a circuit for energizing the solenoid 321 of solenoid valve 321B to operate the valve to open the transfer arm gripping device 170. The relay 349*a* also has self-holding contacts 349*a*–2 in a self-holding circuit. When the gripping device opens, pressure builds up on the rod side of piston 212 to operate the pressure switch 349*b* to de-energize relay 349*a* and cause the stepping of stepping contact 257**.

The engagement of the next contact 350 causes the energization of relay coil 351 through a limit switch 352. The relay coil 351 completes a circuit for operating a solenoid valve to supply fluid pressure to the side of a double-acting cylinder to effect the release of the spindle draw bar mechanism of conventional construction and therefore not shown, to enable the tool holder to be withdrawn from the spindle and the limit switch 352 indicates that the draw bar mechanism has been operated to release the holder. When the switch 352 is operated, the stepping contact 257 is stepped to bridge the following contact 354 of the stepping mechanism. The relay 351, however, is not de-energized on the operation of switch 352 because it is maintained energized by self-holding contacts 351–2.

When the contact 354 is engaged, a relay coil 356 is energized through a limit switch 357 to effect rapid traverse movement of the spindle in an axial direction inwardly of the spindle head to clear the spindle from the tool holder. When the inward movement of the spindle is completed, the limit switch 357 is operated to break the circuit for energizing the relay coil 356 and to step the stepping contact 257 to engage the next contact 360 of the stepping mechanism. When the contact 360 is made, a relay coil 361 is energized through a limit switch 362. The relay has normally open contacts 361–1 which are closed to solenoid 363 to supply fluid pressure to the mechanism for rotating the spindle arm to interchange the position of the tool holder gripping devices 232, 233 to move the device 232 to the intermediate arm transfer position and the device 233 to the spindle position. The solenoid 363 effects the connection of the rod end of the motor 239 to pressure and the other end of the rod to drain. When the position of the gripping devices has been interchanged, the limit switch 362 is operated to break the circuit for energizing relay 361 and to cause a stepping of the stepping contacts 257 to its next position to engage contacts 365. This, however, does not de-energize the relay 361 since it is maintained energized by self-holding contacts 361–2. The initial energization of relay 361 also opened its contacts 361–3 in the holding circuit for relay 341 to effect a de-energization of the solenoid 344 for causing rotation of the spindle hand-off arm in the opposite direction.

The engagement of the contact 365 completes a circuit through connection 366 to contact 316 to energize relay 318 to close the gripper on the transfer arm about the tool held by the spindle hand-off arm in the transfer arm interchange position. The relay 318 has contacts 318–2 in the holding circuit for relay **349*a*. The engagement of the contact 365 also completes a circuit through a limit switch 370 to energize a rapid traverse out relay 371 for the spindle. The energization of the relay 371 causes the spindle to rapid traverse out and as the spindle approaches the interchange position, the limit switch 370 is opened to break the circuit through the contacts 365 and if or when the transfer arm gripping device has closed, the stepping contact 257 steps to engage the next contact 372 to complete a circuit through a limit switch 374 to energize a spindle creep relay 375. The spindle creep relay 375 effects operation of the spindle in an out direction at a creep speed to move the spindle to engage and seat the tool holder. When the spindle reaches the tool change position in which the tool holder is in the spindle, a limit switch 374 is opened and the stepping contact 257 steps to engage contact 377. Engagement of the contact 377 completes a circuit through a limit switch 378 to engage a relay 380 for operating the draw bar mechanism to grip the tool and has contacts 380–1 in series with the self-holding contacts of relay 351 so that the relay 351 is de-energized and the solenoid valve controlled thereby operated to actuate the draw bar mechanism to its holding position. The solenoid which is operated by the relay 351** may control a reciprocating motor and, depending on whether the solenoid is energized or de-energized, may connect one side or the other to pressure and the opposite side to drain.

When the draw bar mechanism for the tool holder has been drawn home to seat the tool, the limit switch 378 is opened to step the stepping contact 257 to engage the next contact 385 to complete a circuit to contact 334 to release the grippers on the spindle hand-off arm.

When the grippers on the spindle hand-off arm are released, the circuit through the contact 385 is broken and the stepping contact 257 moved to engage the next contact 387 to complete a circuit through a limit switch 388 to energize a relay 390. The energization of the relay 390 opens its normally closed contacts 390–1 in the self-holding circuit for relay 361 to cause the de-energization of the solenoid for rotating the spindle hand-off arm to the spindle interchange position and closes its contacts 390–2 to make a circuit through a connection 391 to energize solenoid 344 of solenoid valve 345 to cause the motor 239 to rotate the spindle hand-off arm to move the gripping device 235 toward the transfer position for the intermediate arm. When the arm reaches its park position, the switch 388 is operated to de-energize the relay 390 and the solenoid 344 to cause the solenoid valve to assume a neutral position in which the motor is connected to drain and the park position maintained by spring forces within the motor. The operation of switch 388 causes the stepping of the stepping contact 257 to the next contact 392.

The engagement with contact 392 completes a circuit through a limit switch 394 to energize a relay 396 which has normally closed contacts 396–1 in the holding circuit for relay 331 for energizing solenoid 333. The de-energization of the relay 331 and solenoid 333 causes operation of the valve 333*a* to supply pressure to the motor 198 to return the intermediate transfer arm to its magazine transfer position. When the transfer arm is in the magazine transfer position, the limit switch 394 is opened to break the circuit through the contacts 392 and effect a stepping of the stepping contact 257 to the next contact 400. The relay 396 also has normally closed contacts 396–2 in the holding circuit for relay 335 so that this circuit is broken and the spindle handoff arm grippers closed when the transfer arm is returned.

Engagement of the contact 400 completes a circuit either through a reset relay 402 or to the contact 275 of the stepping mechanism to open the carrier jaws. The particular circuit completed is dependent upon the condition to which relay N6 is preset. If the relay N6 is energized, the circuit is completed by its contact N6–1 to energize the reset relay 402 to close its contacts 402–1 to energize a relay 404 (FIG. 16A). The energization of the relay 404 closes contacts 404–1 in a self-stepping circuit for the stepping coil 255 and opens its normally closed contacts 404–2 between the stepping coil 256 and the stepping contact 257. The self-stepping circuit includes a switch 405 which is opened each time the relay coil is energized to break the energizing circuit and step the mechanism. The relay 404 also has self-holding contacts 404–3 for making a holding circuit for the relay. As the stepping mechanism steps from its position immediately in advance of its home position, it opens a switch 406 in the holding circuit for the relay 404 to de-energize the relay and to stop the stepping of the stepping mechanism at the home position where the stepping contact 257 engages a contact 432 to make a circuit which can be broken by operating a switch 433 or contacts 460Y–1 to step the mechanism and start the cycle again.

In manual operation, the tool will be held at the carrier—intermediate arm transfer position until it is manually released by operating a switch 410 to energize solenoid 321 to open the gripping device 170.

If the relay N6 is de-energized, the circuit is completed through contacts N6–2 to open the carrier jaws and when these jaws are open, the stepping contact 257 is stepped to the next contact 412. When the next contact 412 is engaged, a circuit is completed to contact 308*b* of the stepping mechanism to unlock the carrier drive motor and rapid traverse the carrier to its tarnsfer arm position. When the carrier 30 is at the transfer position, the circuit through the contact 412 is broken and the stepping contact 257 is stepped to engage the contact 416. Engagement of the contact 416 completes a circuit through the contact 416 to the contact 296 of the stepping mechanism to effect a closing of the carrier jaws. When the carrier jaws are closed, the circuit through the contact 416 will be broken by the opening of the limit switch 298 and the stepping contact 257 will step to engage the next contact 418.

When the stepping contact 257 engages the contact 418, a circuit is completed through the contact 418 to the contact 349 of the stepping mechanism to effect an opening of the gripping device 170 on the transfer arm. When the jaws are open, the circuit through the contact 418 is broken by the opening of the pressure switch 349*b* to cause a stepping of the stepping contact 257 to engage the next contact 420.

Engagement of the contact 420 completes a circuit through the contact 420 to the contact 260 of the stepping mechanism to unlock the locking plunger for the carrier and to cause operation of the carrier at a rapid traverse rate to seek out the position number set in the storage circuit. This number is the same number as the storage socket from which the tool was removed. When the carrier has been properly positioned adjacent the storage socket, the mechanism then steps to engage a contact 422 which completes a circuit to the contact 300 of the stepping mechanism to unlock the storage socket. When the storage socket is unlocked, the circuit through the contacts 422 will be broken and the stepping contact 257 will step to the next contact 424.

When the stepping contact engages contact 424, a circuit is made by a connection 424*a* to the contact 281 to cause the carrier to swing right or left as described above. When the carrier jaws have swung right or left to place the tool in the storage socket, the stepping mechanism will be stepped to cause the stepping contact 257 to engage the next contact 426 to engage contact 308*a* to lock the storage socket.

When the storage socket has been locked, the stepping contact 257 is stepped to engage the next contact 428 to complete a circuit through that contact to the contact 275 of the stepping mechanism to open the carrier jaws. When the carrier jaws are opened, the circuit through the contact 428 is broken and the stepping contact 257 steps to engage the next contact 430. Engagement of the contact 430 completes a circuit through the contact to the contact 306 to return the jaws to a transport position. When the jaws are in a transport position, the switch 307 is opened to cause a stepping of the stepping mechanism to engage the next contact 431 to complete a circuit to contact 324 to traverse the carrier to its innermost position. When the limit switch LS1–A is opened, the mechanism steps to engage contact 431*a* connected to the contact 328 to effect a creep and locking operation. The contact 257 is then stepped to engage the next contact 432 which is the home position of the stepping mechanism. When the stepping contact 257 engages the contact 432, a circuit is completed to hold the stepping mechanism in its home position. This circuit is completed through a normally closed push button switch 433 and through normally closed contacts 435 of a relay now shown.

In manual operation, after the stepping mechanism has returned to its home position, the operator may set a new number in the storage socket to select a new tool to be placed in the spindle. When this has been set, switch 433 may be operated to step the mechanism to engage contact 260 and to again start the cycle. The relays N1–N6 may be set by operation of selector switches 434*a*, 434*b*, 434*c*, 434*d*, one for each of the relays N1–N4. These switches may be manually operated or in tape controlled operation may be operated by the tape reader.

In the described embodiment, the tool which has been used is returned to the socket in the storage magazine from which the new tool was selected. This means that the position of the tools in the storage will change and each tool will not have a particular socket to which it is always returned.

In the preferred practice, the tool is always returned to the same socket from which it was originally taken. To accomplish this, it is necessary to provide a memory for the location of this storage socket for the tool in the machine tool spindle and for the carrier of the magazine to be controlled by this number when it is returning the used tool to the magazine.

Referring to FIG. 17, relays P1, P2, P3 and P4 provide a memory for storing the number of the storage socket for a tool which has been moved from the storage magazine to the spindle. The relays P1, P2, P3, P4 correspond respectively to the relays N1, N2, N3, N4 and are energized in accordance with the respective ones of the relays N1, N2, N3, N4 when a relay R is energized. The relay R is energized before a new tool is to be selected. When the relay R is energized, it closes its normally open contacts R1, R2, R3 and R4 to connect the relay coils P1, P2, P3, P4, respectively to the circuits for energizing the relays N1, N2, N3, N4. Consequently, if any of the relays N1 N2, N3 are energized, the corresponding one of the relays P1, P2, P3, P4 will also be energized through the corresponding contact R1, R2, R3, R4.

When a new tool is to be selected in manual operation, a relay E is first energized by operating a switch 450 to open its contacts E–1 in series with respective holding contacts P1–5, P2–5, P3–5, P4–5 for relays P1–P4 respectively to de-energize any of the energized relays. The switch 450 is a push-button type switch and the relay E is de-energized when the switch is released. The relay R is then momentarily energized to set the relays P1–P4 in accordance with the relays N1–N4 by operating a switch 452. The switch 452 is of the push-button type and the relay R is de-energized when the switch is released. A new setting for the relays N1–N4 may then be made by operating the switches shown in FIG. 17 for energizing the relays N1–N4.

The relays P1–P4 have contacts which form a relay tree in cooperation with the limit switches LS1–LS8 between the terminal B of the relay tree 262 and a terminal C in the same manner that the relays N1–N4 have contacts which form a relay tree between the terminals A and B. The contacts of the relays P1–P4 have been given the relay designation with a contact number appended thereto and it can be seen that when the relays P1–P4 are set in accordance with relays N1–N4, the same limit switch must be opened to break the circuit between terminals C and B as is required to be opened to break the circuit between terminals A and B.

The terminal C in a mode of operation where the tool is always to be returned to a particular socket is connected to the contact 420 of the stepping mechanism. In this mode of operation the contact 420 will be connected to junction 329A and will not be connected to terminal A by the connection indicated in FIG. 16 to contact 260. Also a relay 421 will be added and energized from the contact 420 to open its normally closed contacts 421–1 in the circuit from contact 260 to the switch 155. This will cause the carrier with the returning tool to be governed by the number stored in relay P1–P4. The circuit 421 has normally closed contacts 271–4 so that the relay 421 is energized when an output appears on terminal B and the mechanism will be stepped when switch 274 is opened.

In addition, the connection from contact 424 of the stepping mechanism is changed from contact 281 to the dotted connections shown in FIG. 16C which includes contacts P1–1 and P1–2 to control the direction of swing of the carrier. The connection through the contacts P1–1, P1–2 are to the limit switches 287, 288 respectively in the circuits for energizing relays 284D, 285U, respectively.

In tape control operation, additional relay circuitry shown in FIG. 19 may be provided. A relay 454T may be energized when the stepping contact 257 engages contact 432 (see FIG. 16C). This relay may effect the energization of relay E by closing its contacts 454T–1 to break the holding circuits for the relays P1–P4 to assure that the relays are de-energized. The energiztion of the relay E in turn may close its contacts E–2 to energize relay R to close its contacts R1–R4 to set the relays P1–P4 in accordance with the relays N1–N4 as above described. The energization of relay R may also close contacts R–6 to energize a relay 455H to close which has normally closed contacts 455H–1 in series with the contacts 454T–1 for energizing the relay E so that upon energization of relay 455H, the relay E is de-energized. This opens contacts E–2 for energizing relay R. Relay R, however, has self-holding contacts R–7 which hold the circuit for the relay R so that the relay R is not de-energized before contacts E–1 close and re-establish power to the holding circuits for the relays P1–P4. The relay 455H has holding contacts 455H–2 so that the relay is not de-energized when relay R drops out.

The relay R also has contacts R–8 which are closed to energize a tape stepping relay 456TR which operates with a slight time delay. When the tape stepping relay 456TR is energized, it opens its contacts 456TR–1 to de-energize the relay R and also closes contacts to initiate the indexing of the tape reader. When the tape reader is indexed, all of the relays N1–N4 will be de-energized. The relays may have contacts N1–10, N2–10, N3–10, N4–10 which are normally closed contacts that are connected in series to effect energization of a relay 458X when all of the relays N1–N4 are de-energized as the tape steps. The relay 458X has self-holding contacts 458X–1 which form a holding circuit for the relay through normally closed contacts 460Y–2 of a relay 460Y.

The relay 458X also has contacts 458X–2 in a circuit for energizing the relay 460Y through any one of parallel connected contacts N1–11, N2–11, N3–11, N4–11 of the relays N1–N4 so that the relay 460Y is energized only if the indexing of the tape reader effects the energization of one of the relays N1–N4 to indicate that a new tool has been selected. The circuit for energizing the relay 460Y will also include a set of normally open contacts 462 which are closed only when the previous machine operation is completed or about to be completed to signal the start of a tool changing operation. When the relay 460Y is energized as described, it will open its contacts 460Y–1 in the circuit energized by the engagement of the stepping contact 257 with the contact 432. This will cause a stepping of the stepping mechanism from its home position to engage the contact 260 to initiate a tool changing cycle. The relay 455H will be de-energized on the stepping of the contact 257 to allow its contacts 458H–1 in the circuit for energizing the relay E to be closed.

From the foregoing description, it can be seen that the tool may be returned in either manual or tape control operation to the same storage socket from which it was originally taken.

FIGS. 22 and 23 illustrate fluid pressure actuators which may be used in conjunction with the present invention.

FIG. 22 illustrates a type of actuator which is suitable for use in operating the spindle hand-off arm. As illustrated theerin, a piston 800 is slidably mounted on a fixed rod 802 within a cylinder 803. The piston 800 has a more 804 therein which receives the fixed rod 802 and a spring 806 within the bore urges the piston into the intermediate position illustrated by the solid line shown in FIG. 22. The spring 806 encircles the rod 802 within the bore 804 and abuts an annular collar 808 and an annular collar 810 at its opposite ends, respectively. The collars 808, 810 are slidable on the rod 802 and the collar 810 is disposed adjacent the free inner end of the rod 802 and is biased by the spring toward engagement with a head 812 on the end of the rod 802. The piston 800 has a counterbore to provide a shoulder 814 which is adapted to engage the collar 810 to move the collar to the left as the latter is viewed in FIG. 22 to compress the spring. When the piston is moved to the left to compress the spring 806, the collar 808 engages the end of a sleeve 815 fixed on the rod 802 to prevent the collar from moving with the piston. The movement of the piston to the left is limited to the dot-dash position shown in the drawing by engagement of the rod head 812 with the bottom of the bore 802 in the piston. The piston is moved to its left position as illustrated in FIG. 22 by introduction of the pressure into the head end of the bore 804 to act on the piston face 816. If the head end of the cylinder is then connected to return or drain, the spring 806 will cause the piston to assume the solid line position shown in FIG. 22. If pressure is introduced into the rod end of the cylinder to act on the piston face 817 of the piston and the head end of the cylinder connected to drain, the piston 800 will move to the right to the dot-dash position shown in FIG. 22 adjacent the right-hand end of the cylinder. Movement of the piston to the right causes a shoulder 818 formed by an annular member 820 inserted into the bore 804 at the rod end of the piston to engage the collar 808 to cause it to move with the piston and compress the spring 806 so that when both ends of the cylinder are again connected to drain, the piston will be returned to the piston shown in FIG. 22. For use as the motor for the spindle hand-off arm, a rack is fixed to the piston 800.

FIG. 23 illustrates a type of motor which may be used for locking and unlocking the storage sockets or for swinging the carrier 30 between its positions. Referring to FIG. 23, the motor includes a cylinder 840 having rods 841, 842 extending from opposite ends of the cylinder. The cylinder 840 has a bore which receives rods 841, 842 with the rod 841 being received in a bore portion 844 and the rod 842 being received in a bore portion 845. The bore portion 845 is larger than the bore portion 844 to define a shoulder 846 intermediate the ends of the cylinder 840. The rod 842 has an enlarged inner end portion 848 upon which a piston member 850 is slidable between a position in engagement with a shoulder 851 and a second position in engagement with a shoulder 852. The rod 841 has a piston 854 fixed to the inner end thereof and an inner end portion 853 which is adapted to abut the inner end portion 848 on the rod 842.

If the cylinder of the motor illustrated in FIG. 23 is fixed and the rods free to move, introduction of fluid pressure into both ends of the cylinder will cause the pistons to assume the position illustrated in FIG. 23. If the large end of the cylinder is then connected to drain the pressure acting on the piston 854 will cause the piston 854 to push against the inner end portion 848 of the piston rod 842 to move the rod and the piston 846 to the right. If pressure is again supplied to both ends of the cylinder, then the larger area of the piston 850 and the end face 855 of the enlarged portion 850 will cause the pistons to move to the left as viewed in FIG. 23 until the piston 850 engages the shoulder 846. At this time, movement of the piston rods will stop and they will be maintained in this position.

If pressure is removed from the small end of the cylinder 840, the pressure acting on the face 855 of the enlarged portion of the piston rod 842 will cause the portion to move inwardly through the piston 850 to push the piston 854 to the left as viewed in FIG. 23 until the shoulder 852 engages the piston 850. Once again the motors may be returned to a central position by supplying pressure to both ends of the cylinder 840 since the area of the piston 854 is larger than the area of piston face 855.

If the motor is used as the carrier swing motor, the piston rods will be fixed and the cylinder will be movable. In this case, pressure on both ends of the cylinder will cause it to assume the position shown in FIG. 23 while pressure on the large end only will cause the cylinder to move to the right and pressure on the small end only will cause it to move to the left as the cylinder is viewed in FIG. 23.

In the foregoing specification and the following claims, it will be undertsood by those skilled in the art that a tool and tool holder are used interchangeably.

It will be further understood by those skilled in the art that the present invention provides a new and improved tool changing mechanism and a new and improved mechanism for storing and selecting articles from storage and that further modifications, arrangements and constructions will be apparent to those skilled in the art and that it is hereby our intention to cover all such modifications, arrangements and constructions which fall within the spirit and scope of the present invention.

What is claimed is:

1. In a machine tool having a movable spindle head and a rotatable tool spindle projecting outwardly from one face of said spindle head, mechanism on said spindle head for transfering a tool from a tool receiving position to a position in alignment with the spindle axis comprising a transfer arm for receiving a tool when disposed in a first position with the axis of the tool extending crosswise of the spindle axis, gripping means on said transfer arm for gripping said tool, means mounting said transfer arm on said spindle head adjacent and outwardly of said face for rotation about a first axis parallel to the spindle axis to move a tool gripped by said gripping means from said first position to a second position when the tool is to be transferred toward the spindle from said first position, additional means mounting said gripping means on said transfer arm for rotation about a second axis generally perpendicular to said first axis to change the angular orientation of the tool holder to position the axis of the tool holder parallel to the axis of the spindle as the transfer arm is rotated to transfer the tool and rotating means for rotating said gripping means about said second axis of rotation as said arm is rotated.

2. In a machine tool as defined in claim 1 wherein said transfer arm comprises a first member mounted on said spindle head for rotation about an axis parallel to the spindle, said additional means comprises a rotatable member extending radially of the axis of rotation of said first member and rotatably supported by said first member, said gripping mechanism being on said rotatable member and rotatable with said rotatable member, and said rotating means comprises a gear co-axial with the axis of rotation of said first member, and a second gear cooperating with said first gear and co-axial with said rotatable member for effecting a rotation of the latter on rotation of said first member.

3. In a machine tool as defined in claim 1 wherein said transfer arm comprises a first member mounted on said spindle head for rotation about an axis parallel to the spindle axis, and said additional means comprises a rotatable member rotatably mounted on said first member and extending radially of the axis of rotation of the first member, said gripping means being mounted on said rotatable member for rotation therewith, and a fluid pressure actuator for operating said gripping means comprising a piston and cylinder co-axial with said rotatable member.

4. In a machine tool as defined in claim 3 wherein fluid pressure is supplied to said fluid pressure actuator by means comprising gland members co-axial with the axis of rotation of said first member and passageways in said first member and second gland means comprising cooperating parts co-axial with the axis of said rotatable member and comprising passageways in said rotatable member.

5. A tool transfer mechanism as defined in claim 3 wherein said gripping means comprising cooperating gripping elements for engaging the opposite sides of a tool holder, and further comprising pivot means supporting said elements for pivotal movement in a plane containing said second axis between open and closed positions, said gripping elements having first portions extending on the opposite sides of said pivot means from the portions for engaging the tool holder, a locking member on said rotatable member disposable between said first portions when said elements are in a closed position to lock said elements, said actuator comprising a piston and cylinder actuator on said rotatable member for operating said locking member comprising a piston operated member extending generally co-axial with said second axis, a movable member mounted adjacent said piston operated member on said rotatable member, means biasing said movable member toward said elements, crank means connected to said elements and said movable member for operation thereby to open and close said elements upon reciprocation of said movable member, said locking member being movable away from said first portions upon operation of said actuator in one direction and engaging said movable member to move the latter rearwardly to open said gripping elements and said movable member being moved by said biasing means when said locking member is moved in the opposite direction to close said elements as said locking member moves toward engagement with said portions.

6. A tool handling mechanism comprising a member, gripping means on said member for gripping a tool comprising pivoted gripping elements supported for pivoted movement between open and closed positions, a crank on each gripping element, a movable member, link means interconnecting said cranks and said movable member to actuate the cranks upon movement of said movable member, and actuating means for operating said movable member to open and close said gripping elements.

7. A tool handling mechanism as defined in claim 6 wherein said movable member is a reciprocable member.

8. A tool handling mechanism as defined in claim 7 wherein said actuating means comprises a piston and cylinder actuator.

9. A tool handling mechanism as defined in claim 6 wherein spring means biases said movable member in one direction and fluid pressure actuated means is adapted to effect actuation thereof in the opposite direction.

10. A tool transfer mechanism as defined in claim 9 wherein said fluid pressure actuated means comprises piston and cylinder actuator having a piston rod, said movable member being supported adjacent said rod for reciprocation and said rod having a member thereon for operating the movable member in one direction upon movement of said rod in one direction.

11. A tool transfer mechanism including a member and gripping means on said member for gripping the periphery of a tool holder, said gripping means comprising cooperating gripping elements for engaging the opposite side of a tool holder, pivot means supporting said elements for pivotal movement between open and closed positions, said gripping elements having first portions extending on the opposite sides of said pivot means from the portions for engaging the tool holder, means operatively connected to said elements for opening and closing said elements including a locking member movable from a position between said members and in engagement with facing sides of said members to lock said members closed to a releasing position clear of said members.

12. A tool transfer mechanism as defined in claim 11 including actuating means for reciprocating said locking member between a locking position between said first portions and a releasing position clear thereof, operating means actuated by said locking member on movement to said releasing position to open said elements, and additional means for actuating said operating means to close said elements upon movement of said locking member from said releasing position to said locking position.

13. A tool transfer mechanism as defined in claim 12 wherein said additional means comprises biasing means for biasing said elements to a closed position.

14. A tool transfer mechanism as defined in claim 12 wherein said operating means comprises crank means connected to said elements and a movable member engaged by said locking member for operating said crank means.

15. A tool transfer mechanism defined in claim 11 wherein said locking member and each of said first portions have cooperating complementary surfaces which engage each other when said member is in its locking position.

16. In a machine tool having a spindle head, a rotatable spindle extending from one face of said head, said head having sides lying in plane perpendicular to said face, a storage magazine mounted on one of said sides, means for selecting a tool in said storage magazine and transporting said tool to a position adjacent said face with the axis of the tool extending crosswise of the spindle axis, transfer means for transferring said tool from said position to a spindle position where the axis of the tool is substantially in alignment with the axis of the spindle comprising means for translating the tool between said positions and for rotating the tool as it is translated toward said spindle position to position the axis of the tool parallel to the axis of the spindle.

17. In a machine tool as defined in claim 16 wherein said means for translating said tool comprises a gripping means for gripping the tool in said first position, means mounting said gripping means on said spindle head for rotation about an axis parallel to the axis of the spindle to translate said tool and for rotation about a second axis perpendicular to said first axis to reorient the tool to position its axis parallel to the spindle axis.

18. A machine tool as defined in claim 17 wherein a second arm is mounted on said spindle head for rotation about an axis parallel to the axis of said spindle and has second gripping means thereon for receiving said tool from said first arm and is rotatable to translate the tool to a position in alignment with the spindle axis.

19. A machine tool as defined in claim 18 wherein said tool has a radially extending flange and in which one of said gripping means comprises gripping elements adapted to partially encircle said flange and the other of said gripping means comprises gripping elements adapted to grip the opposite radially extending sides of said flange, said latter gripping elements sandwiching one of the gripping elements of said one gripping mechanism on relative movement of one of said gripping means to a position for gripping the tool while it is held by the other gripping mechanism.

20. In a machine tool as defined in claim 18 wherein said second arm is a double-ended arm having gripping devices at each end, said gripping devices being adapted to grip a tool held by said first arm and one in alignment with said spindle axis simultaneously and said second arm being rotatable to interchange the tools, said second arm having a park position, and means on said spindle head from moving said double-ended arm in one direction about its axis from said first position to a position to grip a tool held in by said first arm and said spindle and in a reverse direction about its axis to interchange the tools and in the first said direction about its axis to park the arm as said park position upon the completion of the interchange of the tools.

21. In a tool storage magazine, a plurality of tool storage sockets arranged in spaced parallel rows, a tool carrier movable between said rows to remove a tool from a selected storage socket, said carrier including a gripping device movable between positions for gripping a tool in a selected socket in said rows and to a transport position to remove the tool from the socket and position it for transporting, each of said storage sockets having a locking mechanism associated therewith for locking the tool holder therein, and release means on said carrier operable to operate the locking mechanism of a selected socket only to lock and unlock the socket.

22. A tool storage magazine as defined in claim 21 in which said release means comprises a cam for each row of said storage sockets, said cams being mounted on said carrier for translation therewith and in which shaft means extending along said rows is slidably received in said carrier and is operatively connected to operate said cams.

23. A tool storage magazine as defined in claim 21 in which said release means comprises a cam for each row of said storage sockets, said cams being mounted on said carrier for translation therewith and in which shaft means extending along said rows is slidably received in said carrier and is operatively connected to operate said cams, each of said storage sockets having a linkage adapted to be operated by the cam corresponding to the row of storage sockets in which the socket is located and said cam being disposed to operate a respective linkage when said carrier is in a position to remove a tool from a selected socket.

24. A tool storage magazine as defined in claim 21 in which said release means comprises a cam for each row of said storage sockets, said cams being mounted on said carrier for translation therewith and in which shaft means extending along said rows is slidably received in said carrier and is operatively connected to operate said cams, each of said storage sockets having a linkage adapted to be operated by the cam corresponding to the row of storage sockets in which the socket is located and said cam being disposed to operate a respective linkage when said carrier is in a position to remove a tool from a selected socket, each of said sockets comprising a pair of cooperating locking arms for holding a tool, spring means for yieldably biasing said arms to a locked position, a cam movable to a first position to lock said arms in a closed position against the bias of said spring means, second spring means for biasing said cam to its said first position and means connecting said cam to the said linkage for the socket for operation thereby to a second position permitting said arm to open.

25. In a machine tool, a tool storage magazine associated with said machine tool for storing tools to be used in a spindle of the machine tool, said magazine having a plurality of storage sockets and an individual tool stored in each socket, first permutation code means having a plurality of unique conditions and adapted to be set to a selected one of said conditions, each of said conditions corresponding to a respective one of said sockets, second permutation code means having a plurality of unique conditions and adapted to be set to a selected one of said conditions, each of said conditions of said second permutation code means corresponding to a respective one of said sockets, transfer means for removing a selected tool from the magazine and transferring it to a position away from the storage magazine and for subsequently returning the tool to the storage magazine after the selection and removal of another tool from the magazine including means to select and remove a tool in accordance with the setting said first permutation code means and to return a removed tool in accordance with the setting of said second permutation code means.

26. In a machine tool, the combination defined in claim 25 wherein said second permutation code means is set in accordance with the present setting of said first permutation code means prior to the next setting of said first permutation code means to select a new tool to be removed from the storage sockets and controls the return of tools to said storage sockets.

27. In a machine tool, the combination defined in claim 25 in which said transfer means includes a tool handling member having a gripping device thereon for gripping a tool in the tool storage socket and removing the tool from the socket and for returning a tool to the socket, power actuated means for relatively moving said member and said sockets to position said member at transfer positions for removing tools from or returning tools to corresponding sockets, switching means actuated adjacent each transfer position to stop the relative movement of the member and sockets in a transfer position, said first and second permutation code means having contact means forming a relay tree with said switching means for controlling said power actuated means.

28. In a machine tool, the combination defined in claim 27 in which said power actuated means comprises a motor for relatively moving said sockets and tool handling member, a first member positively driven by said motor, a second member engageable with said first member when the latter is in a position corresponding to a transfer position for a storage socket and said tool handling member to lock said first member and motor against movement, actuating means for holding said second member in an inactive position, control means actuated by said switching means for releasing said second member to move to a locking position and means actuated in response to the locking engagement of said first and second members to stop said motor.

29. In a machine tool, the combination defined in claim 28 wherein said switching means actuates means for slowing said motor as the relative positions of said sockets and member approach a transfer position adjacent a socket.

30. In a machine tool, the combination as defined in claim 29 wherein said switching means is actuated when said transfer means and storage sockets are relatively displaced in one direction from a preceding transfer position and said means for slowing said motor in response to said switching means includes means for effecting operation of the motor toward the next corresponding transfer postion.

31. In an article handing apparatus, an article storage magazine comprising a plurality of spaced stores for storing articles, article handling means, power actuated means for relatively moving said stores and article handling means to sequentially relatively move the article handling means and stores through transfer positions one for each of said stores and in which articles are transferable between said handling means and the corresponding store, means for selecting a transfer position comprising switch means having an individual switch for each transfer location actuated as the transfer location is approached during relative movement of said stores and article handling means and a relay tree including said switch means settable to complete a circuit through a selected one of said switches and provide a signal on the actuation of said switch, and means responsive to said signal to effect the stopping of said relative movement to relatively position said stores and handling means at the corresponding transfer position.

32. In an article handling apparatus as defined in claim 31 in which said power actuated means comprises a motor for relatively moving said stores and article handling means, a first member positively driven by said motor, a second member engageable with said first member when the latter is in a position corresponding to a transfer position for a store and said article handling means to lock said first member and said motor against movement, actuating means for holding said second member in an inactive position, control means actuated by said switching means for releasing said second member to move to a locking position, and means actuated in response to the locking engagement of said first and second members to stop said motor.

33. In a machine tool as defined in claim 16, wherein said magazine comprises a row of storage sockets and said means for selecting and removing a tool from said magazine comprises a carrier movable along said row, said carrier including a gripping device movable between positions for gripping a tool in a socket and a transport position to remove a selected tool from a socket, each of said storage sockets having a locking mechanism associated therewith for locking the tool holder therein, and release means on said carrier operable to operate the locking mechanism of a selected socket only to lock and unlock the socket.

34. A machine tool as defined in claim 33 in which said release means comprises a cam mounted on said carrier for translation therewith and in which shaft means extending along said row is slidably received in said carrier and is operatively connected to operate said cams.

35. A machine tool as defined in claim 34 in which said release means comprises a cam mounted on said carrier for translation therewith and in which shaft means extending along said row is slidably received in said carrier and is operatively connected to operate said cam, each of said storage sockets having a linkage adapted to be operated by said cam disposed on said carrier to operate a respective linkage when said carrier is in a position to remove a tool from a selected socket.

References Cited

UNITED STATES PATENTS

| | | | |
|---|---|---|---|
| 3,276,116 | 10/1966 | Stark | 29—568 |
| 3,327,386 | 6/1967 | Jerue | 29—568 |

RICHARD H. EANES, Jr., *Primary Examiner.*